(12) United States Patent
Kimura et al.

(10) Patent No.: US 10,083,519 B2
(45) Date of Patent: Sep. 25, 2018

(54) INFORMATION PROCESSING APPARATUS AND INFORMATION PROCESSING METHOD FOR SPECIFYING A COMPOSITION OF A PICTURE

(71) Applicant: SONY CORPORATION, Tokyo (JP)

(72) Inventors: Takaomi Kimura, Tokyo (JP); Suguru Aoki, Tokyo (JP); Kosei Yamashita, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 56 days.

(21) Appl. No.: 15/104,268

(22) PCT Filed: Oct. 16, 2014

(86) PCT No.: PCT/JP2014/077593
§ 371 (c)(1),
(2) Date: Jun. 14, 2016

(87) PCT Pub. No.: WO2015/098251
PCT Pub. Date: Jul. 2, 2015

(65) Prior Publication Data
US 2016/0321822 A1 Nov. 3, 2016

(30) Foreign Application Priority Data
Dec. 24, 2013 (JP) ................................. 2013-265271

(51) Int. Cl.
*G06K 9/00* (2006.01)
*G06T 7/20* (2017.01)
(Continued)

(52) U.S. Cl.
CPC ............ *G06T 7/2033* (2013.01); *G06T 7/246* (2017.01); *G06T 7/73* (2017.01); *H04N 5/23219* (2013.01);
(Continued)

(58) Field of Classification Search
None
See application file for complete search history.

(56) References Cited

U.S. PATENT DOCUMENTS

2005/0213817 A1* 9/2005 Miyamori .......... G06K 9/00335
382/181
2015/0016685 A1* 1/2015 Matsunaga ........ G09B 19/0038
382/103

FOREIGN PATENT DOCUMENTS

JP 59-194761 A 11/1984
JP 2002-126147 A 5/2002
(Continued)

*Primary Examiner* — Idowu O Osifade
(74) *Attorney, Agent, or Firm* — Chip Law Group

(57) ABSTRACT

[Object] To easily obtain a picture capable of being effectively analyzed, by specifying a composition of a picture acquired by an imaging apparatus.
[Solution] Provided is an information processing apparatus including: an angular field estimation section configured to estimate an angular field of a picture acquired by an imaging apparatus, based on positions of at least two points whose position relationship in a real space is already known in the picture; and a composition specification information output section configured to output information specifying a composition of the picture, in a manner that a position relationship between a photographic subject and the imaging apparatus, prescribed in accordance with the angular field, is satisfied.

14 Claims, 17 Drawing Sheets

(51) Int. Cl.
*H04N 5/232* (2006.01)
*G06T 7/73* (2017.01)
*G06T 7/246* (2017.01)

(52) U.S. Cl.
CPC ..... *H04N 5/23222* (2013.01); *H04N 5/23293* (2013.01); *G06T 2207/30224* (2013.01); *G06T 2207/30241* (2013.01)

(56) References Cited

FOREIGN PATENT DOCUMENTS

| JP | 2010-063052 A | 3/2010 |
| JP | 2010-109567 A | 5/2010 |
| JP | 2013-074376 A | 4/2013 |
| JP | 2013-213872 A | 10/2013 |

\* cited by examiner

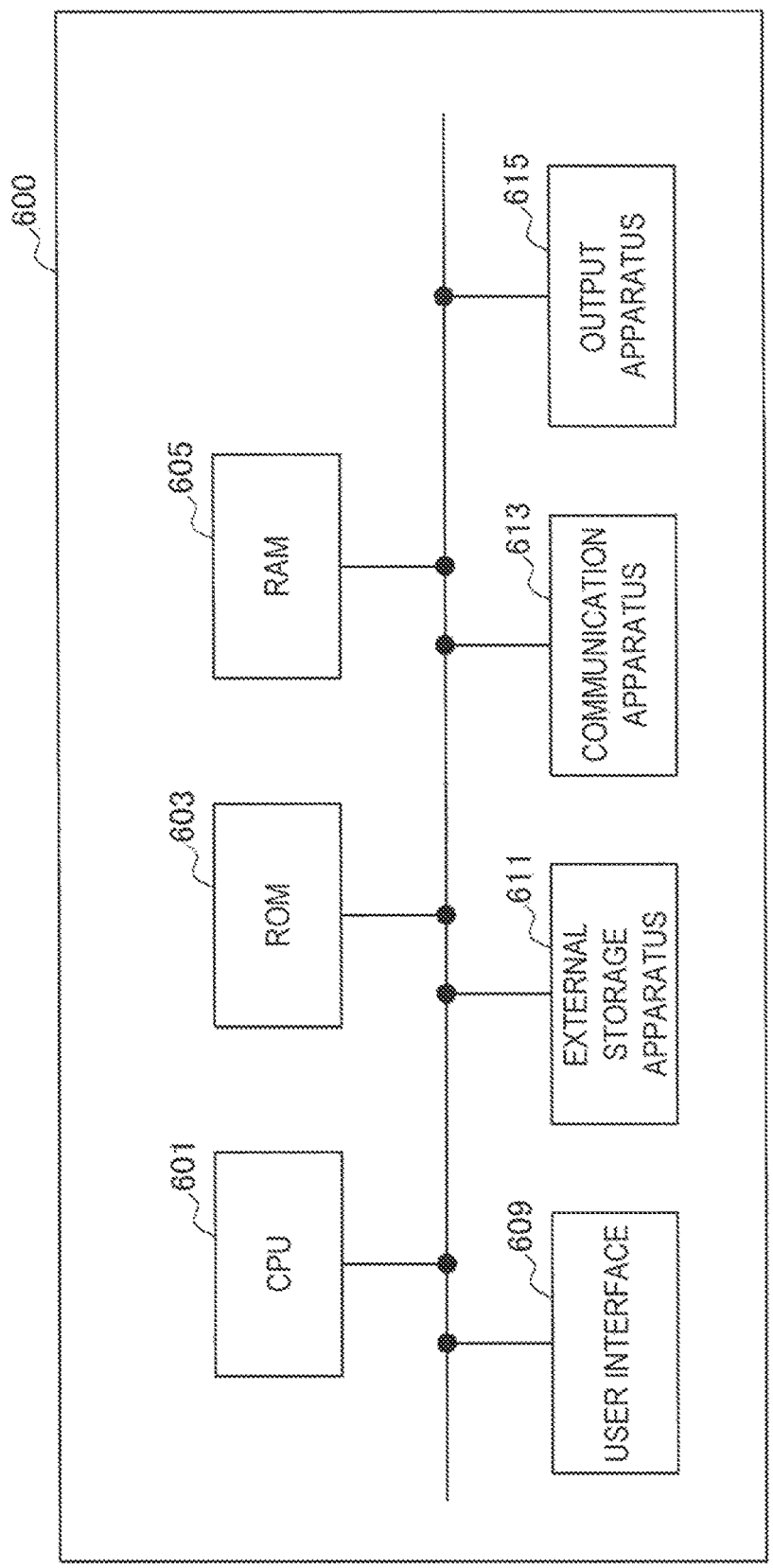

INFORMATION PROCESSING APPARATUS AND INFORMATION PROCESSING METHOD FOR SPECIFYING A COMPOSITION OF A PICTURE

CROSS REFERENCE TO RELATED APPLICATIONS

This application is a U.S. National Phase of International Patent Application No. PCT/JP2014/077593 filed on Oct. 16, 2014, which claims priority benefit of Japanese Patent Application No. JP 2013-265271 filed in the Japan Patent Office on Dec. 24, 2013. Each of the above-referenced applications is hereby incorporated herein by reference in its entirety.

TECHNICAL FIELD

The present disclosure relates to an information processing apparatus, a recording medium, and an information processing method.

BACKGROUND ART

Up until now, many technologies have been developed that assist the movements of a user, by using sensing or analysis. As such technology, for example, in sports where a ball is hit by using a hitting tool, such as tennis, badminton, table tennis, golf or baseball, the frequency at which a ball is hit by the hitting tool and the position at which the ball is hit are detected, and these are presented as information to a user. As an example of such technology, Patent Literature 1 discloses technology, for example, which arranges sensors on a hitting surface of a tennis racket and the surroundings of this, detects where the ball hits the hitting surface, and notifies the frequency and position of this to a user.

CITATION LIST

Patent Literature

Patent Literature 1: JP S59-194761A

SUMMARY OF INVENTION

Technical Problem

In the technology disclosed in Patent Literature 1, a large number of sensors are arranged corresponding to each of the positions on the hitting surface of the tennis racket. In this way, it is possible to detect not only the frequency at which the ball has hit the hitting surface, but also where on the hitting surface the ball has hit. However, such a large number of sensors will take time to be installed after a user has purchased a hitting tool. While hitting tools may be sold that have sensors built-in beforehand, the price of the hitting tool will increase, and it will be difficult for a user to replace the hitting tool. Further, while a method can also be considered where the instant the ball collides is photographed by using a high-speed camera capable of photographing with a frame rate of one several thousandth, and the position at which the ball is hit is confirmed from a picture, a high-speed camera has a high cost, and the operation is also complex, and so it may be difficult for a user to easily use.

On the other hand, photographing a picture within a play has becomes more common, by using a digital camera, or a camera mounted on a terminal apparatus such as a smart phone. However, a picture using such a camera has a frame rate that is low, or is not photographed with a fixed composition with respect to a user or a ball, and so it will be difficult to implement an analysis the same as that of a picture photographed, for example, by using the above described high-speed camera.

Accordingly, the present disclosure proposes a new and improved information processing apparatus, recording medium, and information processing method, capable of easily obtaining a picture capable of being effectively analyzed, by specifying a composition of a picture acquired by an imaging apparatus.

Solution to Problem

According to the present disclosure, there is provided an information processing apparatus including: an angular field estimation section configured to estimate an angular field of a picture acquired by an imaging apparatus, based on positions of at least two points whose position relationship in a real space is already known in the picture; and a composition specification information output section configured to output information specifying a composition of the picture, in a manner that a position relationship between a photographic subject and the imaging apparatus, prescribed in accordance with the angular field, is satisfied.

According to the present disclosure, there is provided a recording medium having a program stored therein, the program causing a computer to implement: a function of estimating an angular field of a picture acquired by an imaging apparatus, based on positions of at least two points whose position relationship in a real space is already known in the picture; and a function of outputting information specifying a composition of the picture, in a manner that a position relationship between a photographic subject and the imaging apparatus, prescribed in accordance with the angular field, is satisfied.

According to the present disclosure, there is provided an information processing method including: estimating, by a processor, an angular field of a picture acquired by an imaging apparatus, based on positions of at least two points whose position relationship in a real space is already known in the picture; and outputting information specifying a composition of the picture, in a manner that a position relationship between a photographic subject and the imaging apparatus, prescribed in accordance with the angular field, is satisfied.

Advantageous Effects of Invention

According to the present disclosure such as described above, a picture capable of being effectively analyzed can be easily obtained, by specifying a composition of a picture acquired by an imaging apparatus.

Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 17 is a figure that shows an example of a hardware configuration of an analysis apparatus according to an embodiment of the present disclosure.

DESCRIPTION OF EMBODIMENTS

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

The description will be given in the following order.
1. System configuration
2. Configuration of the processing section
 2-1. Angular field estimation section
 2-2. Composition specification information output section
 2-3. Picture analysis section
3. Component elements constituting the processing section
 3-1. Control of recording using sensor data
 3-2. Picture reproduction of a segment different to an analysis segment
 3-3. Picture display during analysis
 3-4. Display of an analysis result
4. Hardware configurations
5. Supplement (1. System Configuration)

Figure 1:
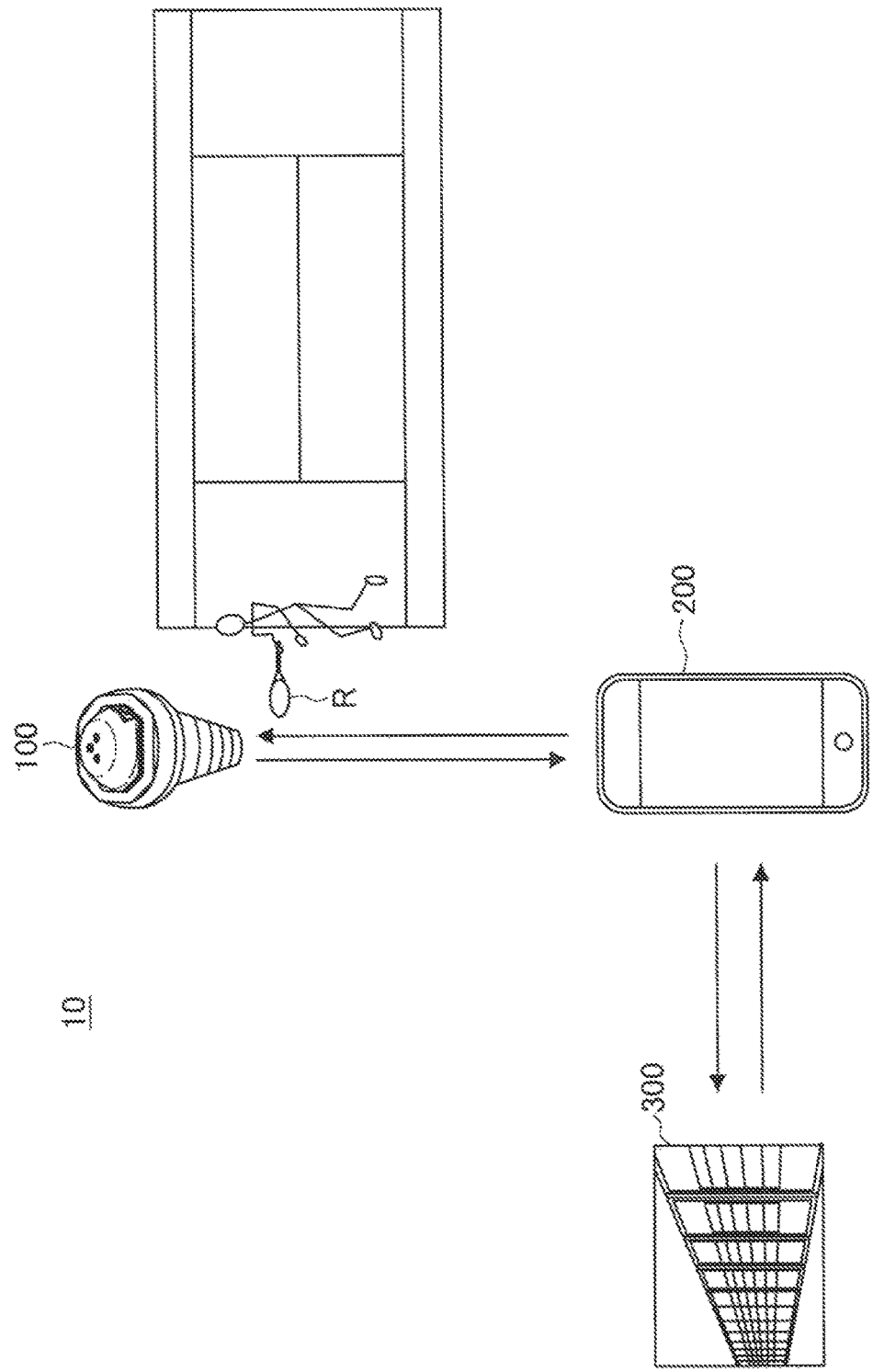
FIG. 1 is a figure that shows an example of a system configuration according to an embodiment of the present disclosure.

FIG. 1 is a figure that shows an example of a system configuration according to an embodiment of the present disclosure. With reference to FIG. 1, the system 10 includes a sensor apparatus 100, a smart phone 200, and a server 300. The sensor apparatus 100 is mounted on a tennis racket R. For example, the sensor apparatus 100 includes a vibration sensor, and detects vibrations generated in the racket R due to a ball colliding with the racket R. For example, vibration data acquired by the vibration sensor is transmitted to the smart phone 200 by wireless communication such as Bluetooth (registered trademark). Further, the sensor apparatus 100 may include an acceleration sensor, an angular velocity sensor, a magnetic field sensor or the like (for example, a nine axis motion sensor), and may detect acceleration, angular velocity, inclination or the like of the racket R. The data acquired by these sensors is also transmitted to the smart phone 200 by wireless communication.

The smart phone 200 receives the data transmitted from the sensor apparatus 100. The smart phone 200 may execute an analysis process based on the received data. In this case, the smart phone 200 may output an analysis result to a user, and may upload the analysis data to the server 300. Alternatively, the smart phone 200 may forward the received data to the server 300. In this case, the smart phone 200 may receive a result of the analysis process executed by the server 300, and may output this result to the user.

Further, in the illustrated example, the smart phone 200 includes a camera capable of acquiring a picture that includes, as a photographic subject, a user who is playing tennis. As will be described below, in the present embodiment, while information that specifies a composition of a picture acquired by the camera is output, this output may be executed by the smart phone 200. For example, an picture captured by the camera may be displayed as a through picture on a display of the smart phone 200, and information that specifies a composition may be displayed superimposed on the through picture. A specific example of such information will be described below. Note that, the smart phone 200 may be replaced by another apparatus that includes an imaging function and an output function, for example, a tablet terminal, a digital camera or the like. The smart phone 200 may generate information that specifies a composition, for example, by analyzing a captured picture itself, or may request, to the server 300, a process for generating information that specifies a composition.

Note that, in a separate example, a terminal apparatus such as the smart phone 200 outputting information that specifies a composition of a picture, and an imaging apparatus that acquires a picture, may be in separate apparatuses. For example, the system 10 may include a digital camera separate from the smart phone 200, and information that specifies a composition of a picture acquired by the digital camera may be generated via the smart phone 200. In this case, data of the acquired picture (for example, a through picture), from the digital camera, is transmitted to the smart phone 200, and the smart phone 200 generates information that specifies a composition by an analysis of the picture. Alternatively, the smart phone 200 additionally transfers data of the picture to the server 300, and request the generation of information that specifies a composition. The generated information is output by the smart phone 200, or is transmitted from the smart phone 200 to the digital camera and output from the digital camera. The smart phone 200 itself may be replaced by a digital camera having an information processing function as described above.

The server 300 communicates with the smart phone 200 via a network, and receives an analysis result of the data acquired in the sensor apparatus 100 or the data of this. Further, the server 300 may receive data of a picture captured from the smart phone 200. The server 300 retains an analysis result uploaded from the smart phone 200 or an analysis result calculated from the server 300 itself, and transmits this analysis result to a terminal apparatus used by the user such as the smart phone 200 as necessary. Further, the server 300 may transmit an analysis result to the terminal apparatus used by a user other than the user who has provided the analysis result or the data, and may enable sharing of the analysis result between the users.

Figure 2:
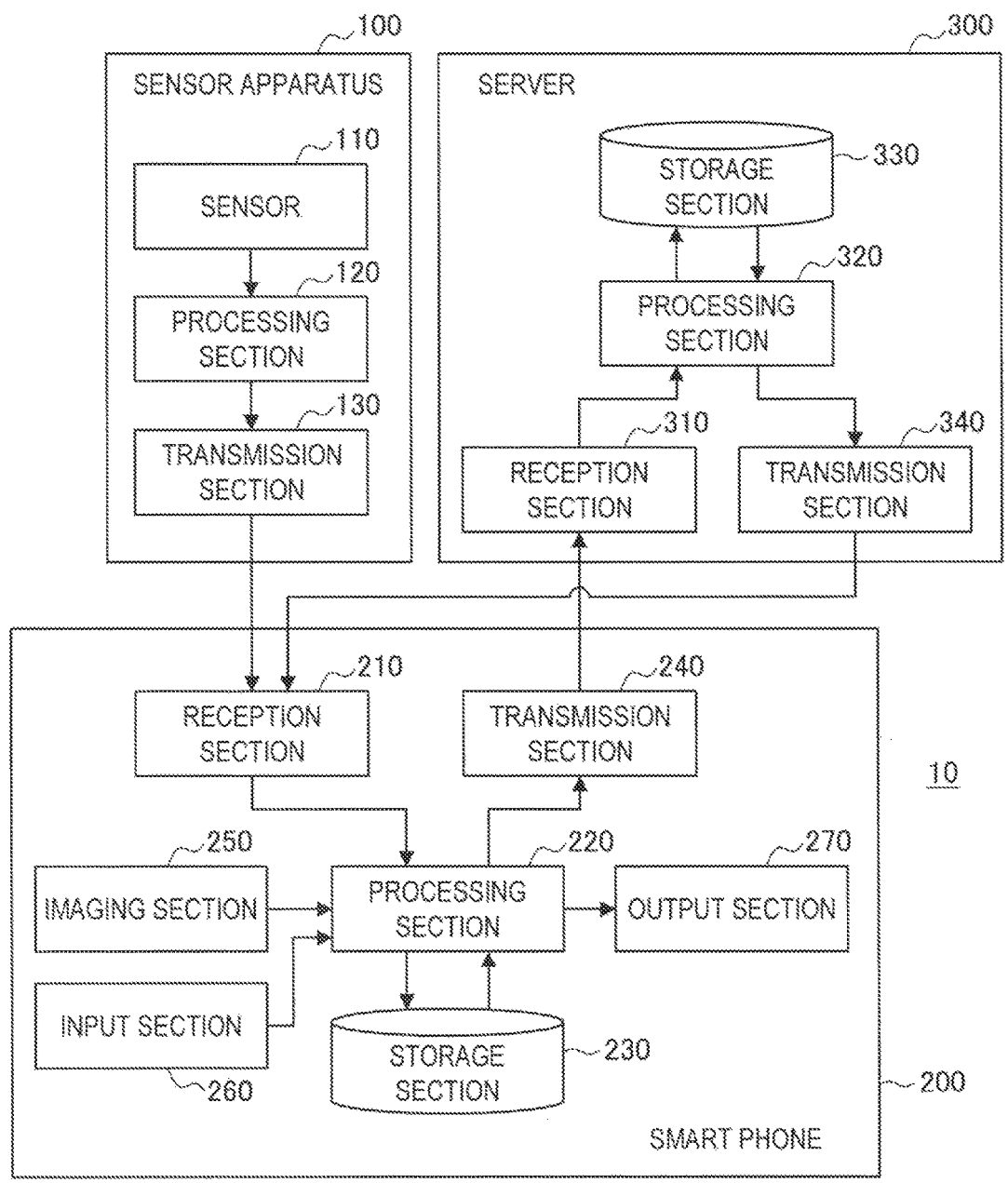
FIG. 2 is a block diagram that shows a schematic apparatus configuration of a system according to an embodiment of the present disclosure.

FIG. 2 is a block diagram that shows a schematic apparatus configuration of the system according to an embodiment of the present disclosure. With reference to FIG. 2, the system 10 includes the sensor apparatus 100, the smart phone 200, and the server 300, and in addition, a hardware configuration example of an information processing apparatus that implements each apparatus will be described below.

The sensor apparatus 100 includes a sensor 110, a processing section 120, and a transmission section 130. For example, the sensor 110 includes a vibration sensor, an angular velocity sensor, an angular velocity sensor and/or magnetic field sensor or the like (for example, a nine axis motion sensor). For example, the processing section 120 is implemented by a processor such as a CPU or the like, and processes data acquired by the sensor 110. For example, the processes by the processing section 120 may be preprocesses such as sampling or noise removal, or may include an analysis process. The transmission section 130 is implemented by a communication apparatus, and transmits data to the smart phone 200, for example, by using wireless communication such as Bluetooth (registered trademark).

The smart phone 200 includes a reception section 210, a processing section 220, a storage section 230, a transmission section 240, an imaging section 250, an input section 260, and an output section 270. The reception section 210 is implemented by a communication apparatus, and receives data transmitted by using wireless communication such as Bluetooth (registered trademark) from the sensor apparatus 100. In addition, the reception section 210 may receive data transmitted from the server 300 by using network communication. The processing section 220 is implemented, for example, by a processor such as a CPU, and processes the received data. For example, the processing section 220 may temporarily accumulate the received data in the storage section 230, and thereafter may transmit the accumulated data to the server 300 via the transmission section 240. Further, the processing section 220 may execute an analysis of the received or acquired data. The storage section 230 is implemented, for example, by a memory or storage. The transmission section 240 is implemented by a communication apparatus, and transmits audio data (or data after analysis) to the server 300, for example, by using network communication such as the internet.

The imaging section 250 is implemented, for example, by a camera module that combines an optical system of lenses or the like with an imaging sensor, and acquires pictures that include a user who is playing tennis as a photographic subject. For example, the imaging section 250 continuously provides captured pictures to the processing section 220 during startup. The processing section 220 causes a display included in the output section 270 to display the provided pictures as through pictures, and stores picture data in the storage section 230 in the case where imaging of still pictures or moving pictures is executed.

The input section 260 accepts an operation input of a user to the smart phone 200. For example, the input section 260 may include an input apparatus such as a touch panel or hardware buttons installed on the display, and may include a microphone for accepting audio of a user as an operation input, or a camera or sensor or the like for accepting gestures of a user as an operation input. The output section 270 outputs various types of information of the user to the smart phone 200. For example, the output section 270 includes a display, a speaker or the like. The output section 270 outputs information that specifies a composition of a picture, for example, acquired by the imaging section 250.

The server 300 includes a reception section 310, a processing section 320, a storage section 330, and a transmission section 340. The reception section 310 is implemented by a communication apparatus, and receives data transmitted by using network communication such as the internet from the smart phone 200. The processing section 320 is implemented, for example, by a processor such as a CPU, and processes the received data. For example, the processing section 320 executes an analysis process of the process of the received data, and may additionally accumulate data after analysis in the storage section 330, or may output the data via the transmission section 340. Alternatively, the processing section 320 may only execute a control of the accumulation or output of the data already analyzed in the smart phone 200 or the like.

(2. Configuration of the Processing Section)

Figure 3:
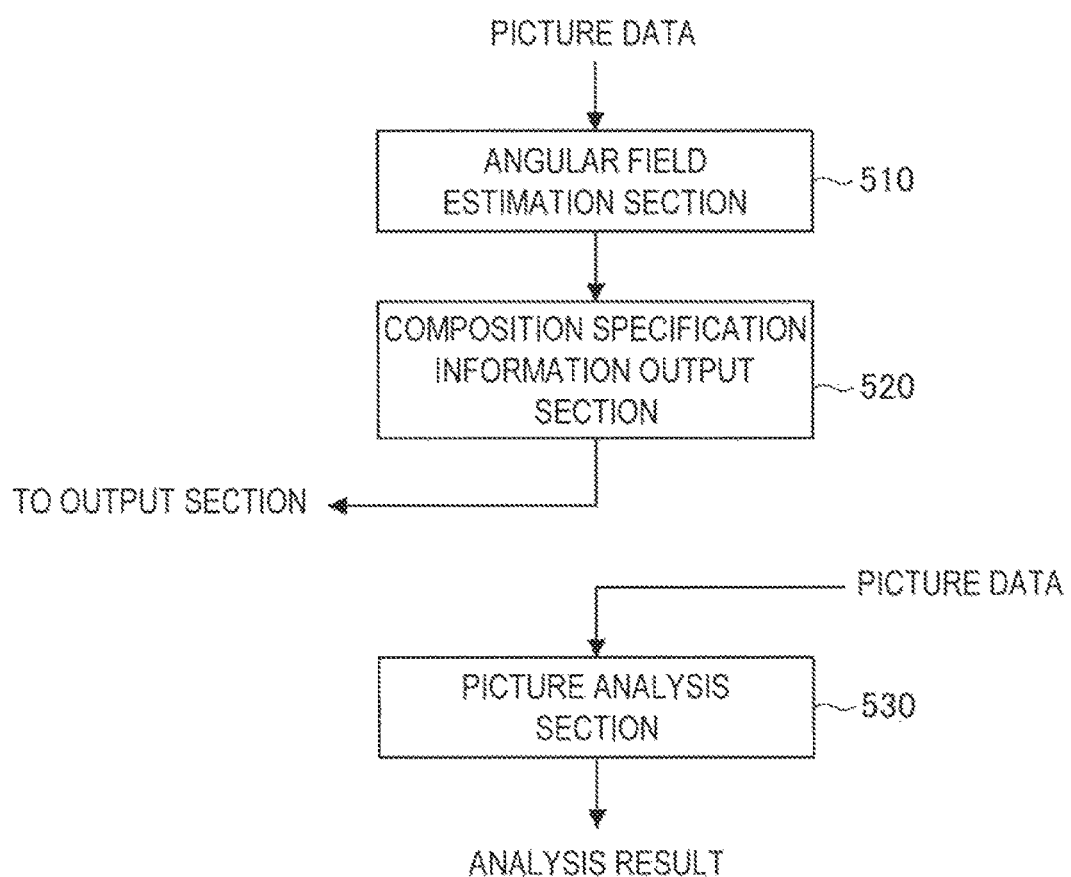
FIG. 3 is a schematic block diagram that shows a configuration of a processing section in an embodiment of the present disclosure.

FIG. 3 is a schematic block diagram that shows a configuration of the processing section in an embodiment of the present disclosure. With reference to FIG. 3, the processing section according to the present embodiment includes an angular field estimation section 510, and a composition specification information output section 520. The processing section may additionally include a picture analysis section 530.

Here, the angular field estimation section 510, the composition specification information output section 520, and the picture analysis section 530 are implemented, for example, in the system 10 described above with reference to FIG. 2, in the processing section 220 of the smart phone 200, or the processing section 320 of the server 300. The entire processing section may be implemented in a single apparatus, or one or a plurality of the component elements may be implemented by distributing to respectively different apparatuses.

(2-1. Angular Field Estimation Section)

The angular field estimation section 510 estimates an angular field of a picture acquired by an imaging apparatus, with at least two points of a position relationship in a real space that are already known, based on the position relationship in the picture. This point will be additionally described by referring to FIG. 4 and FIG. 5.

Figure 4:
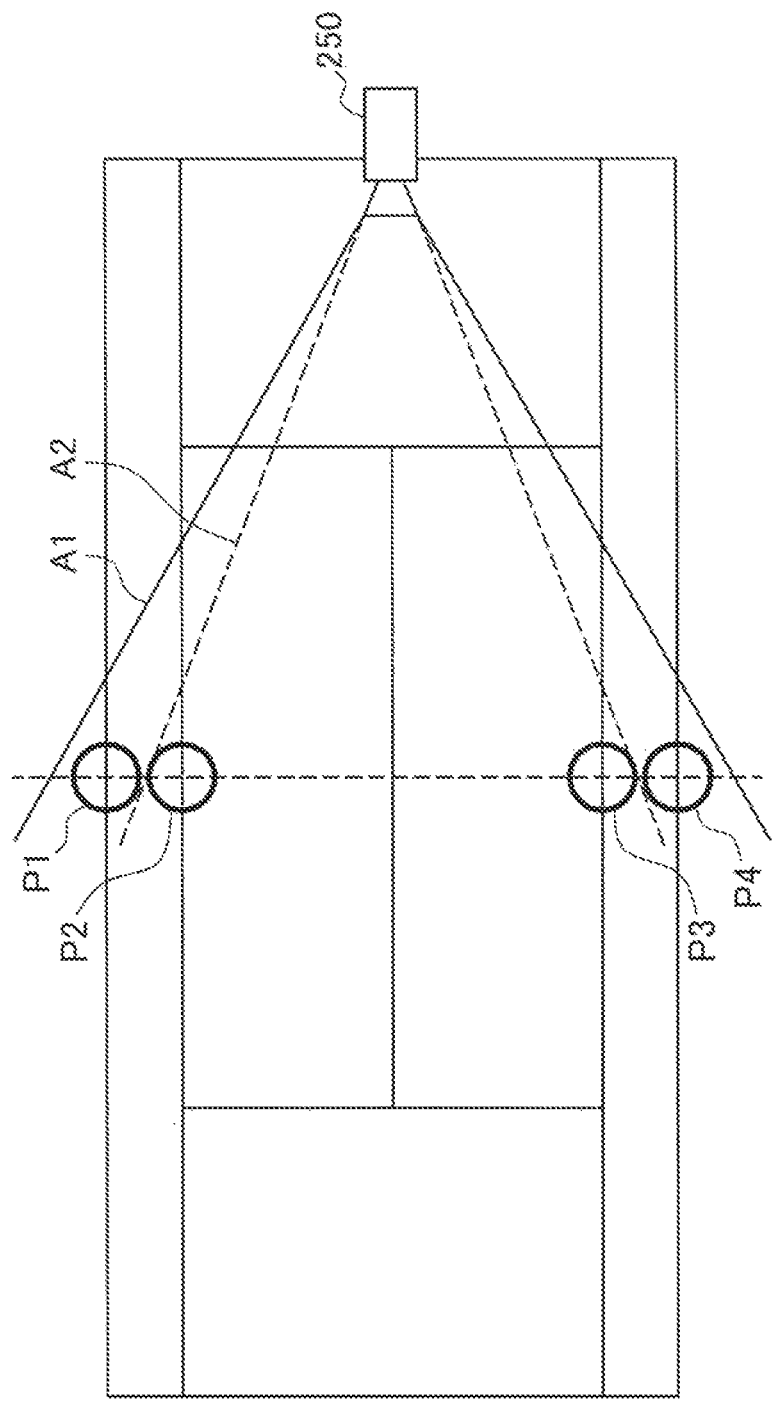
FIG. 4 is a figure for describing an estimation of an angular field in an embodiment of the present disclosure.

FIG. 4 is a figure for describing an estimation of an angular field in an embodiment of the present disclosure. The imaging section 250 (imaging apparatus) of the smart phone 200, and two angular fields A1 and A2 of a picture acquired by the imaging section 250, are shown in FIG. 4. The angular fields A1 and A2 are mutually different, and the angular field A1 is wider than the angular field A2. Such a difference of angular fields is caused by the arrangement of an optical system that includes, for example, an imaging sensor and lens constituting the imaging apparatus. Further, the angular field changes, for example, if changing the resolution of a picture, changing the aspect ratio, or performing a zoom operation, even if the same imaging apparatus.

For example, while the angular field estimation section 510 may be implemented by the imaging section 250 and the processing section 220 in the same smart phone 200, it will not be easy to internally acquire all the setting information such as described above from the imaging section 250, even in this case. Especially in the case where the apparatus in which the angular field estimation section 510 is implemented and the imaging apparatus are separate, it will not be easy to acquire all the setting information such as described above to prescribe an angular field.

Accordingly, in the present embodiment, the angular field estimation section 510 estimates an angular field of a picture, based on the positions within the picture of intersection points P1 and P4 between the sideline of a tennis court and the net, and intersection points P2 and P3 between the sideline for singles and the net. Since these points P1 to P4 are points on the tennis court prescribed in accordance with rules, this position relationship is already known. Therefore, for example, an angular field of a picture can be estimated, based on the positions of the points P1 to P4 in the picture, if capturing the picture of the direction of the points P1 to P4 upon arranging an imaging apparatus (imaging section 250) at a prescribed position (for example, on the center of the base line of the tennis court).

More specifically, for example, in the case where the points P1 and P2 are reflected at portions near to the right edge of a captured picture, and the points P3 and P4 are reflected at portions near to the left edge, the angular field estimation section 510 can estimate that the angular field is near to A1. Further, in the case where the point P2 is reflected at a portion near to the right edge of the captured picture, the point P3 is reflected at a portion near to the left edge, and the points P1 and P4 are not reflected in the picture, the angular field estimation section 510 can estimate that the angular field is near to A2. Since the distance between the point P2 and the point P3 is already known, it is possible to estimate an angular field, if at least the point P2 and the point P3 are included in the picture. However, having all the points P1 to P4 included in the picture will increase the accuracy of an estimation.

Figure 5:
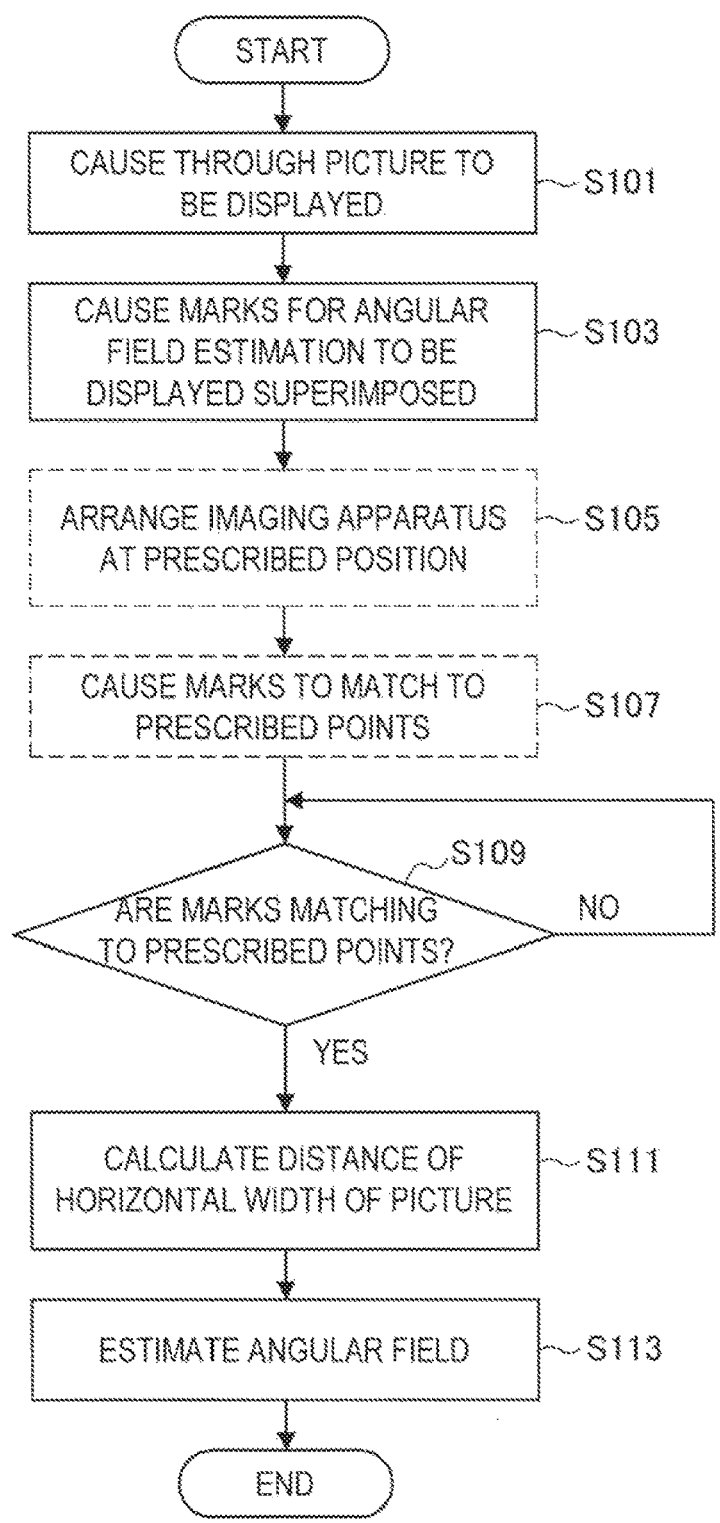
FIG. 5 is a flow chart that shows an example of the processes of an estimation of an angular field in an embodiment of the present disclosure.

FIG. 5 is a flow chart that shows an example of the processes of an estimation of an angular field in an embodiment of the present disclosure. With reference to FIG. 5, first, the angular field estimation section 510 causes the display included in the output section 270 of the smart phone 200 to display a through picture (S101). The through picture is a picture of a real space acquired by the imaging section 250, or another imaging apparatus. Note that, the through picture may be already displayed prior to S101. Next, the angular field estimation section 510 causes marks for an angular field estimation to be displayed superimposed on the through picture displayed on the display (S103). The marks for an angular field estimation are figures such as circles or cross lines, for example, corresponding to the points P1 to P4 in the above example.

Here, a user arranges the imaging apparatus at a prescribed position (S105). If the above example, the user arranges the imaging apparatus (the smart phone 200 that includes the imaging section 250, or another imaging apparatus) towards the net, at the center of the baseline of the tennis court. In addition, the user causes the marks displayed superimposed in S103 to move, by operating a touch panel on the display included in the input section 260 of the smart phone 200, and causes them to match to prescribed points within the through picture (S107). For example, if the case of the points P1 to P4 in the above example, the user causes the four marks displayed on the display to respectively match to the four intersection points between the sideline and the sideline for singles and the net.

Next, the angular field estimation section 510 decides whether or not the positions of the prescribed points in the through picture and the positions of the marks moved by the user match (S109). Here, in the case where it is not possible for the angular field estimation section 510 to specify the positions of the prescribed points in the through picture by a picture analysis, it may be decided that the positions of the prescribed points and the positions of the marks match, based on an operation of the user via the input section 260 such as a touch panel. Further, in the case where it is possible for the angular field estimation section 510 to specify the positions of the prescribed points in the through picture by a picture analysis, the angular field estimation section 510 may automatically decide that the positions of the prescribed points and the positions of the marks match, and may output a dialogue or the like, which confirms whether an angular field may be decided, to the user in the case where it is decided that there is a match.

Alternatively, in the case where it is possible for the angular field estimation section 510 to specify the positions of the prescribed points in the through picture by a picture analysis, the angular field estimation section 510 may carry out the operation of the user of S107, and may cause the marks to automatically move. In this case, for example, a user operation for causing an angular field specification to start is executed via the input section 260 at the point in time when the imaging apparatus of the user is arranged at a prescribed position in S105, and all the steps from S107 onwards may be automatically executed. Alternatively, the user may confirm a relationship between the positions of the marks automatically moved in S107 and the positions of the prescribed points in the through picture, and in the case where it is recognized that these positions are matching, may execute a user operation showing that the positions match in S109.

In S109, in the case where it is decided that the positions of the prescribed points in the through picture and the positions of the marks that are displayed superimposed match, the angular field estimation section 510 calculates a distance in a real space of the horizontal width of the picture (S111). For example, if the case of the points P1 to P4 in the above example, a reduced scale for a real space of the picture can be calculated, on the surface that includes the points P1 to P4, by comparing the distance in a real space between each of the points P1 to P4, and the distance between each of these points within the picture. In this way, the distance in a real space of the horizontal width of the picture on this surface can be calculated. This calculation result may be expressed, for example, as a coefficient for converting one pixel in the picture into a distance unit of a real space (for example, meters).

Next, the angular field estimation section 510 estimates an angular field based on the distance from the position of the imaging apparatus up to the prescribed points (S113). In S105, the imaging apparatus is arranged at a prescribed position, more specifically, for example, at the center of the baseline of the tennis court. Therefore, the distance between the surface that includes the points P1 to P4 and the imaging apparatus is already known. Therefore, it becomes possible for the angular field estimation section 510 to estimate an angular field of the picture, for example, with a shape such as the angular fields A1 and A2 shown in FIG. 4. When an angular field is estimated, the imaging apparatus can decide up to what range in a real space can be contained in the picture.

Heretofore, a process has been described where the angular field estimation section 510 estimates an angular field of a picture. In the present embodiment, in this way, the angular field estimation section 510 estimates an angular field of a picture acquired by an imaging apparatus, with two points of a position relationship of a real space that are already known, based on the position in the picture. The angular field estimation section 510 may estimate an angular field of a picture based on the position in the picture of an image of a first flat or three-dimensional object that includes at least two points (for example, the image that includes the tennis court and the net in the above example). Here, the first flat or three-dimensional object may include a line prescribing a court, a field, or a course (for example, the tennis court in the above example).

Further, as another example, the angular field estimation section 510 may estimate an angular field of a picture based on a position change in the picture of an object (for example, a ball) falling through a track that includes at least two points. As is well known, the same gravitational acceleration acts on a falling object (including an object that has tossed up and that seems to ascend) regardless of the mass or shape of the object, and so a position change per time will become the same if having the same initial velocity. Therefore, for example, if a change amount of the position of an object in a picture is measured at two points in time during falling if the initial velocity of the object is known, and three points in time during falling if the initial velocity is unknown, a reduced scale for a real space of the picture can be calculated on the surface that includes the falling track of the object, similar to the above example, and an angular field of the picture can be additionally estimated based on the distance from the position of the imaging apparatus up to the falling track of the object.

In addition, as another example, the angular field estimation section 510 may estimate an angular field of a picture acquired by the imaging apparatus, by capturing a picture that includes at least two points in common from three of more different positions. In the above example, an angular field has been estimated from a single picture, by capturing a picture that includes at least two points of a position relationship that is already known from a position where the position relationship between these points is already known. In contrast to this, if capturing a picture that commonly includes these points from three or more different positions, even if a position relationship is unknown between at least two points of a position relationship that is already known, the relationship of respective imaging positions can be calculated, by the principle of triangulation, and an angular field of the picture can be additionally estimated.

(2-2. Composition Specification Information Output Section)

By referring again to FIG. 3, the composition specification information output section 520 outputs information that specifies a composition of a picture, so that a position relationship between a photographic subject and the imaging apparatus, prescribed in accordance with the angular field estimated by the angular field estimation section 510, is satisfied. This point will be additionally described by referring to FIG. 6 to FIG. 9.

Figure 6:
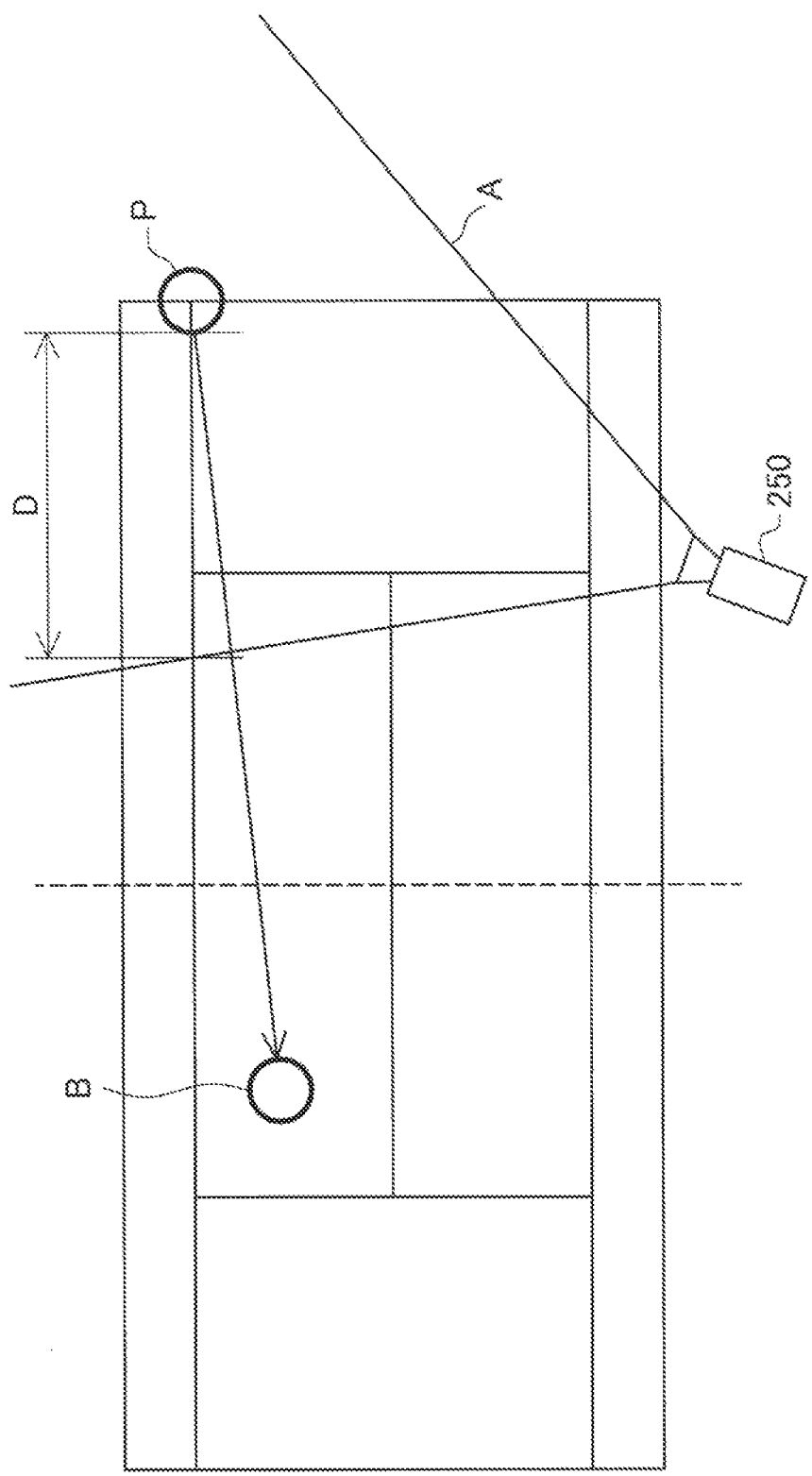
FIG. 6 is a figure for describing a specification of a composition in an embodiment of the present disclosure.

FIG. 6 is a figure for describing a specification of a composition in an embodiment of the present disclosure. The imaging section 250 (imaging apparatus) of the smart phone 200, and a player P and a ball B included in an angular field A of a picture acquired by the imaging section 250, are shown in FIG. 6. In the illustrated example, the picture acquired by the imaging section 250 is used for analyzing a play where the player P hits the ball B (for example, a serve of tennis).

The composition specification information output section 520 outputs information for capturing a picture with an optimized composition for an analysis such as described above. Hereinafter, while the case of a serve of tennis will be described as an example, for an optimized composition, the composition may be similarly optimized for another play, another ball game, or another operation other than for a sport.

For example, the composition may be optimized so that (1) the ball being tossed is reflected. More specifically, the player P is arranged on the lower side of the picture as much as possible, and the space of the picture top widened, so that the ball B tossed by the player P is not out of focus.

Further, for example, the composition may be optimized so that (2) an impact point of the ball is reflected. More specifically, the vicinity of the player P, where it is assumed that the player P hits the ball B with a racket, is contained in the picture.

Further, for example, the composition may be optimized so that (3) the ball after an impact is reflected across a certain extent of time. More specifically, the player P is arranged on the right side of the picture (in the case where hitting from the right to the left such as in the illustrated example), so that the distance that the ball B after an impact moves within an angular field (the distance D shown in FIG. 6) is made as long as possible, or becomes a prescribed distance or more. For example, in the case where the velocity or the like of the ball B after an impact is calculated based on an analysis of the picture, it will be desirable for the ball after an impact to be reflected across a number of frames to a certain extent, and so optimization from this viewpoint will be important.

Further, for example, the composition is optimized so that (4) an angle with respect to a movement direction of the ball after an impact approaches a right angle. More specifically, an angle of the imaging section 250 with respect to a predicted flat track of the ball after an impact approaches a right angle. For example, tracking of the ball B between frames will become easier, and the accuracy of a calculation of the velocity will also improve, as an angle with respect to a movement direction of the ball B after an impact approaches a right angle.

For example, the composition optimized such as described above may be different in accordance with an angular field of the picture. For example, it will not necessarily be limited to an optimization being implemented such as in the above (1) to (4), if an angular field of the picture is different, even if the composition specification information output section 520 specifies a position at which the player P is to be arranged within the picture by a superimposed display or the like to a through picture. For example, when the compositions implementing the above (3) and (4) in a picture of a certain angular field are applied to another picture with a different angular field as it, for example, a picture with a horizontal width that is narrower, the distance D shown in FIG. 6 becomes small due to the horizontal width of the picture being narrow, and there is the possibility that (3) is not implemented. In such a case, it can be considered, in a picture of the latter case, for example, that it is desirable to implement (3) upon setting (4) to be sacrificed to a certain extent (upon allowing an angle with respect to a movement direction of the ball to be made).

By reasons such as described above, in the present embodiment, the composition specification information output section 520 determines a composition specified by information to be output in accordance with an angular field estimated by the angular field estimation section 510. The composition may be prepared beforehand, for example, for each range of an angular field (for example, set in accordance with the distance of a horizontal width of a picture), or may be calculated in accordance with an estimated angular field. The composition is expressed, for example, by a standing position of the player P in the picture, and an angle of the imaging section 250 with respect to the ground surface.

Figure 7:
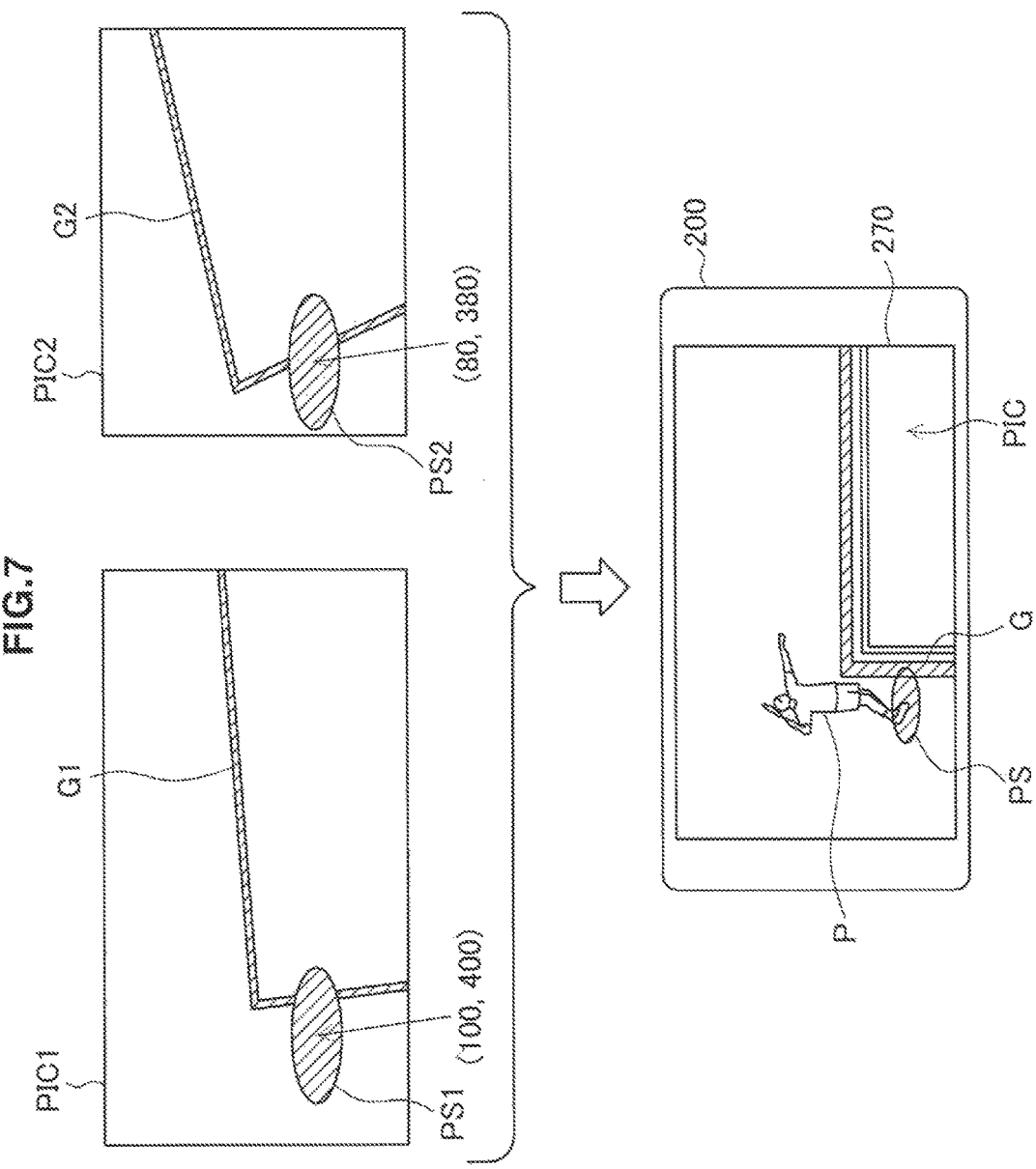
FIG. 7 is a figure for describing a display of a guide in an embodiment of the present disclosure.

FIG. 7 is a figure for describing a display of a guide in an embodiment of the present disclosure. Guides respectively displayed in through pictures PIC1 and PIC2 are shown in FIG. 7. In the illustrated examples, the guides include a guide line G (G1, G2), and a standing position PS of a player (PS1, PS2).

As described above, the guide line G and the player standing position PS are displayed superimposed, for example, on the through picture PIC displayed on the display included in the output section 270 of the smart phone 200. A composition specified by the composition specification information output section 520 is implemented, by having a user cause the smart phone to move, and respectively overlap the standing position PS on the feet of the player P, and the guide line G on a line of a tennis court. The guide that includes the guide line G and the player standing position PS is an example of information that specifies a composition of a picture, output by the composition specification information output section 520.

Here, in the illustrated examples, the through picture PIC1 and the through picture PIC2 are pictures with respectively different angular fields. Therefore, as described above, the composition to be implemented in each picture will be different. Therefore, the guide line G1 and the standing position PS1 displayed in the through picture PIC1, and the guide line G2 and the standing position PS2 displayed in the through picture PIC2, will be mutually different. More specifically, there are coordinates (100, 400) on the basis of the picture left-bottom edge of the standing position PS1, and in contrast, there are coordinates (80, 380) on the basis of the picture left-bottom edge of the standing position PS2. Further, the guide line G2 is inclined with respect to the horizontal direction of the picture more than the guide line G1.

In this way, by having different guides displayed, in the case where the standing position of the player P and the line of the court are matched to the guide, in the respective cases of the through picture PIC1 and the through picture PIC2, the position and angle of the imaging section 250 (imaging apparatus) may be different. In this way, in the respective cases where the angular fields of the picture are different, the composition specification information output section 520 can implement a more appropriate composition than that adapted for the respective angular fields.

Figure 8:
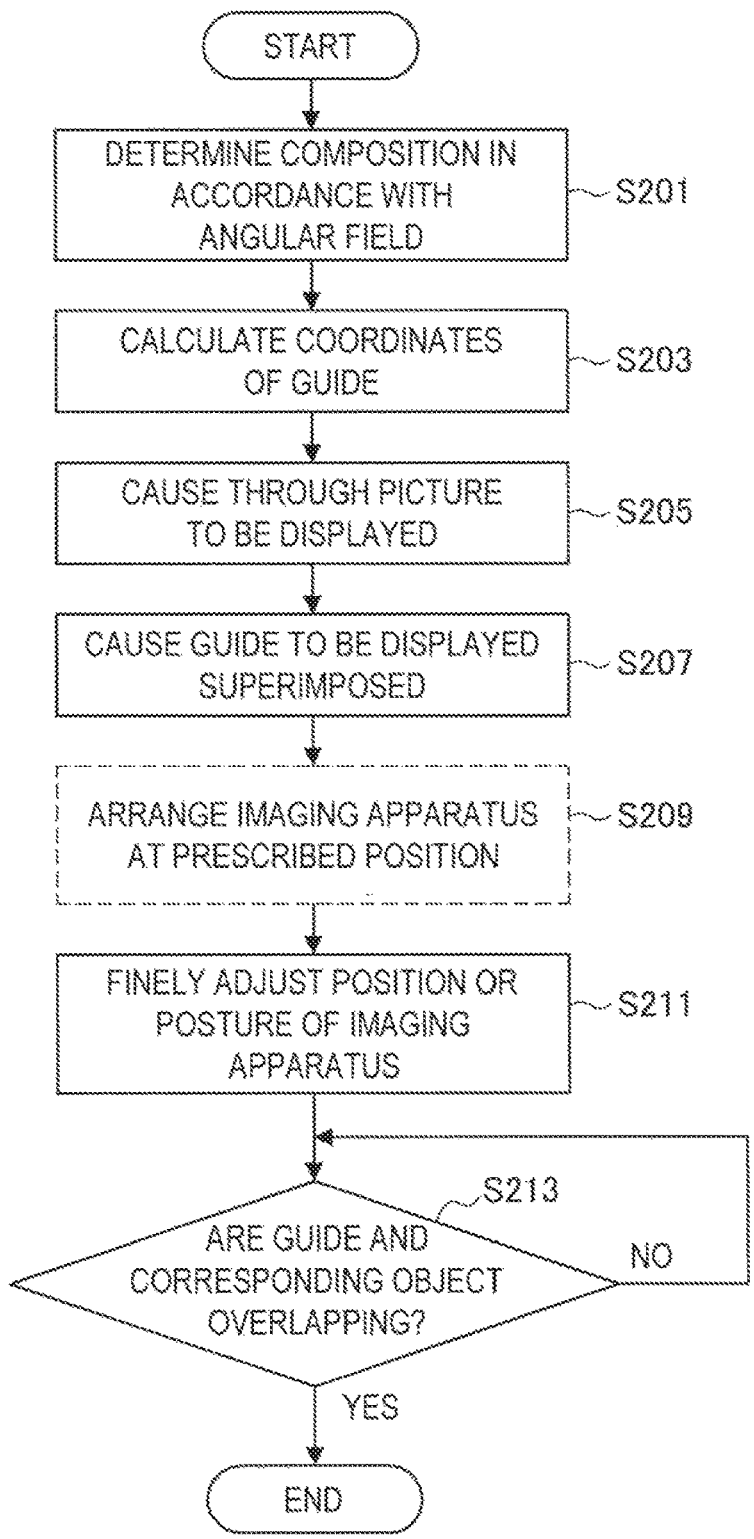
FIG. 8 is a flow chart that shows an example of the processes of a specification of a composition in an embodiment of the present disclosure.

FIG. 8 is a flow chart that shows an example of the processes of a specification of a composition in an embodiment of the present disclosure. With reference to FIG. 8, first, the composition specification information output section 520 determines a composition in accordance with an angular field of the picture estimated by the angular field estimation section 510 (S201). The composition may be optimized, for example, from viewpoints such as in (1) to (4) described above, may be selected from that prepared beforehand for each angular field, or may be calculated on this occasion in accordance with an angular field. Next, the composition specification information output section 520 calculates coordinates of a guide to be displayed superimposed on a through picture, based on the angular field and the composition (S203).

Next, the composition specification information output section 520 causes the display included in the output section 270 of the smart phone 200 to display the through picture (S205). The through picture is a picture of a real space acquired by the imaging section 250, or another imaging apparatus. Note that, the through picture may be already displayed prior to S205. In addition, the composition specification information output section 520 causes the guide according to the coordinates calculated in S203 to be displayed superimposed on the through picture displayed on the display (S207). The guide may include, for example, the standing position PS of the player, and the guide line G, such as shown in the above example of FIG. 7.

Here, a user arranges the imaging apparatus at a prescribed position, in accordance with the display of the guide (S209). While an appropriate composition will be different for each angular field such as described above, the imaging apparatus to be arranged and the position of this will be the same (for example, the position of the imaging section 250 shown in FIG. 6). Accordingly, as in the illustrated example, a procedure may be adopted where first the user arranges the imaging apparatus at a prescribed position regardless of the angular field, and afterwards, finely adjusts the position and posture of the imaging apparatus by using the guide displayed superimposed on the through picture (S211). If the above example of FIG. 7, the user (photographer) may finely adjust the position and posture of the imaging apparatus, so that the standing position PS matches the feet of the player on the display, and the guide line G is overlapping on the line of the court, upon standing at the position of the imaging section 250 shown in FIG. 6.

Next, the composition specification information output section 520 decides whether or not the guide displayed on the through picture, and an object corresponding to the guide, are overlapping (S213). Here, in the case where it is not possible for the composition specification information output section 520 to specify the position or shape of the object in the through picture by a picture analysis, it may be decided that the guide and the object are overlapping, based on an operation of the user via the input section 260 such as a touch panel. Further, in the case where it is possible for the composition specification information output section 520 to specify the position or shape of the object in the through picture by a picture analysis, the composition specification information output section 520 may automatically decide that the guide and the object are overlapping, and may output a dialogue or the like, which confirms whether a composition may be decided, to the user in the case where it is decided that there is an overlap. In S213, in the case where it is decided that the guide and the object are overlapping, the process that specifies a composition is completed, and the processes of imaging and analysis of the picture, for example, are started.

Figure 9:
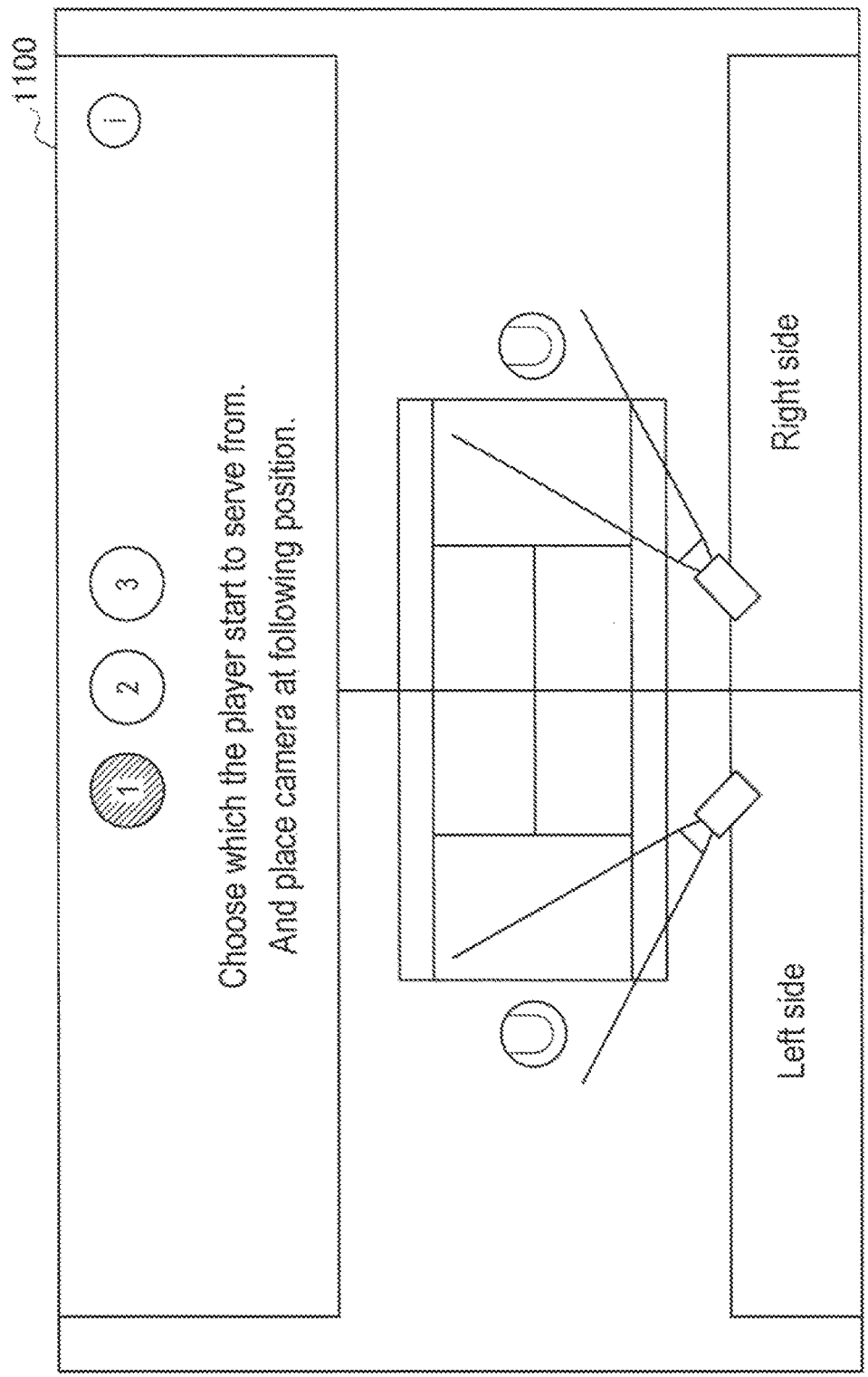
FIG. 9 is a figure that shows an example of a picture displayed for a specification of a composition in an embodiment of the present disclosure.

FIG. 9 is a figure that shows an example of a picture displayed for a specification of a composition, in an embodiment of the present disclosure. A picture 1100 displayed on the display included in the output section 270 of the smart phone 200, for example, is shown in FIG. 9. In the picture 1100, a user interface for specifying at what side of the tennis court a player who hits a serve is to be captured is displayed. The composition specification information output section 520 selects a composition to be specified and information to be displayed for implementing this composition, for example, based on information input via such a user interface. Note that, for example, in the illustrated example, the left-right of the guide displayed by the composition specification information output section 520 may be reversed, in the case where the left side (Left side) is selected and the case where the right side (Right side) is selected.

Heretofore, a process has been described where the composition specification information output section 520 outputs information that specifies a composition of a picture. In the present embodiment, in this way, the composition specification information output section 520 outputs information that specifies a composition of a picture, so that a position relationship between a photographic subject and the imaging apparatus, prescribed in accordance with an angular field of the picture, is satisfied. The composition specification information output section 520 may output information for displaying a guide where the specified composition is implemented by overlapping on a second flat or three-dimensional object (for example, the player or the line of the court in the above example) visually recognized in a through picture acquired by the imaging apparatus (imaging section 250). Here, the second flat or three-dimensional object may include a line prescribing a court, a field, or a course (for example, the tennis court in the above example), and a photographic subject (for example, the player in the above example) arranged at a prescribed position on the court, the field, or the course.

Further, the composition specification information output section 520 may output information that specifies a composition of the picture, so that at least three points in the vicinity of the photographic subject are arranged at prescribed positions. As in the above example, in the case where the position in a space of the imaging apparatus (photographer) is specified, a composition of the picture can be specified if arranging two points at prescribed positions in the picture. Further, even in the case where the position in a space of the imaging apparatus (photographer) is not specified, an appropriate composition of the picture can be specified, upon specifying the position in a space of the imaging apparatus (photographer), by arranging three points at prescribed positions in the picture. Further, the photographic subject may include a player arranged on the court or the field, or a ball thrown (includes the case of being hit, the case of being thrown, the case of being kicked or the like) by a play (for example, a serve of tennis in the above example) of this player. In this case, the composition specification information output section 520 may output information that specifies a composition of the picture, so that the ball is positioned within an angular field of the picture, at a prescribed time after this play (for example, the optimization of the composition shown in (3) of the above examples).

Further, as another example, the composition specification information output section 520 may output information that specifies a composition of the picture, by a method other than a display to the display. For example, the composition specification information output section 520 may output information that specifies a composition of the picture, by a voice. In this case, for example, the composition specification information output section 520 specifies the position or shape of an object in a through picture by a picture analysis, and calculates a deviation amount between the guide and the object. In addition, the composition specification information output section 520 may cause an instruction, such as "please move a little to the right", "please shake your left hand a little" or the like, to be output by a voice from a speaker included in the output section 270 of the smart phone 200, for example, based on the deviation amount. Further, for example, in the case where executing photography within a room or the like, the guide may be projected on a real space, by using a projector, a laser pointer or the like.

Further, as another additional example, the composition specification information output section 520 may output information that specifies a composition of the picture, in the case where the imaging section 250 (imaging apparatus) is not fixed and moves. For example, the range necessary for analysis, the vicinity of a player and above this if the case of a serve of tennis, for example, and the space of the direction where the ball is hit may be included in the picture, for an analysis by the picture analysis section 530, which will be described below, and the imaging section 250 may not be necessarily be fixed. In this case, the picture analysis section 530 can calculate a change of the spacial position or posture of the imaging section 250, for example, on the basis of the standing position of the player, the line of the tennis court or the like, and can correct the picture acquired based on these and use this for analysis. In the case where the imaging section 250 moves, the composition specification information output section 520 may output information that specifies a composition of the picture by including a prescribed margin, so that a picture of a necessary range can be acquired even if the imaging section 250 moves to a certain extent.

(2-3. Picture Analysis Section)

By again referring to FIG. 3, the picture analysis section 530 executes a picture analysis based on the picture acquired in accordance with a composition specified by information output by the composition specification information output section 520. By this picture analysis, for example, in the case where a photographic subject includes a flying object, the velocity of the object may be estimated. Further, in the case where a photographic subject includes a rotating object, the rotation velocity of the object may be estimated. In the case where a photographic subject includes a parabolic-moving object, the position change amount of the object may be estimated. The object in these examples may be, for example, a ball thrown (hit, thrown, or kicked) in a play of a sport. In the case of a ball, the above estimation may be interpreted as an estimation of the ball speed, an estimation of the ball spin, and an estimation of the height that the ball has been tossed.

It is known that such a picture analysis is possible, for example, in the case where the frame rate or resolution of an acquired picture is sufficiently high. However, for example, it will be difficult to execute such a picture analysis by using a picture acquired by a digital camera or a camera mounted in a smart phone. For example, in the case where an object is flying with a great velocity with respect to the frame rate, it will be difficult to calculate the velocity or the like, when the object is framed out with a low number of frames. Further, when an object flying in such a track is unknown, it is necessary to search for the object in the entire picture, and so a process such as tracking between frames or the like will be difficult.

In contrast to this, in the present embodiment, a picture acquired in accordance with an optimized composition, specified by the composition specification information output section 520 in accordance with a composition estimated by the angular field estimation section 510, becomes a target of analysis in the picture analysis section 530. Therefore, for example, it is possible to set a composition so that the object (ball) thrown by a play of the player is positioned within an angular field of the picture across a prescribed time (a prescribed number of frames), and frame-out can be prevented without delay after an impact by the object. Further, by having a composition specified beforehand, it is possible for a track of the object in the picture to be predicted, and so the range of a search can be narrowed down, and a process such as tracking with a high accuracy, for example, is possible.

In this case, in the present embodiment, by specifying a composition of a picture acquired by the imaging apparatus, it may be possible to implement an effective analysis, for example, by using a picture acquired by a digital camera or a camera mounted in a smart phone. Note that, for a specific technique of a picture analysis, it is possible to apply a technique implemented by setting a picture with a sufficiently high frame rate or resolution up until here as a target, and so a detailed description will be omitted here.

(3. Component Elements Constituting the Processing Section)

Figure 10:
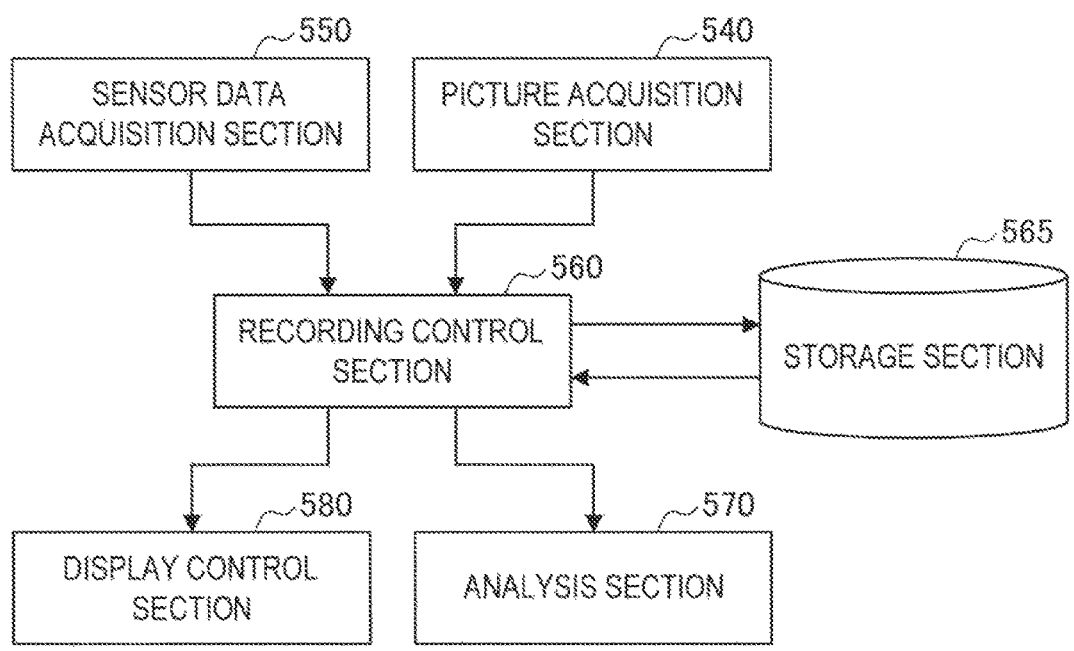
FIG. 10 is a schematic block diagram that shows the component elements constituting the processing section in an embodiment of the present disclosure.

FIG. 10 is a schematic block diagram that shows the component elements constituting the processing section in an embodiment of the present disclosure. The processing section in the present embodiment may include the following component elements, in addition to the component elements described with reference to FIG. 3, or in place of these. With reference to FIG. 10, the processing section according to the present embodiment may include a picture acquisition section 540, a sensor data acquisition section 550, a recording control section 560, a storage section 565, an analysis section 570, and a display control section 580.

Here, the picture acquisition section 540, the sensor data acquisition section 550, the recording control section 560, the analysis section 570, and the display control section 580 are implemented, for example, in the system 10 described above with reference to FIG. 2, in the processing section 220 of the smart phone 200, or the processing section 320 of the server 300. The entire processing section may be implemented in a single apparatus, or one or a plurality of the component elements may be implemented by distributing to respectively different apparatuses.

The picture acquisition section 540 acquires a picture captured in the imaging section 250 of the smart phone 200, or another imaging apparatus. The acquired picture may be a moving picture, for example, in which a series of plays by a player are captured.

The sensor data acquisition section 550 acquires sensor data output from the sensor 110 of the sensor apparatus 100. The sensor data shows, for example, a vibration or motion (an acceleration, angular velocity, direction or the like) generated in a tool (for example, the racket R) used by the player, or in the player himself or herself.

The recording control section 560 controls recording to the storage section 565 of the picture acquired by the picture acquisition section 540, based on an operation of a user, and/or the sensor data acquired by sensor data acquisition section 550. For example, the recording control section 560 may temporarily record the picture acquired by the picture acquisition section 540 in the storage section 565, and may specify a portion that becomes a target of analysis by the analysis section 570. Further, the recording control section 560 may temporarily record the picture acquired by the picture acquisition section 540 in the storage section 565, and may generate a picture displayed on the display by the display control section 580 from this picture.

The analysis section 570 executes an analysis process based on the picture acquired by the picture acquisition section 540 and/or the sensor data acquired by the sensor data acquisition section 550. The analysis section 570 may include, for example, the picture analysis section 530 described above with reference to FIG. 3. The analysis section 570 calculates the position where a ball hits the racket R, for example, based on vibration data acquired by the sensor data acquisition section 550, and particular vibration characteristics of the racket R measured beforehand. Further, the analysis section 570 may additionally calculate the velocity, rotation or the like of the ball after an impact, based on the velocity of the racket R before an impact. It is also possible for the analysis section 570 to calculate the velocity, rotation, track or the like of the ball, based on the picture acquired by the picture acquisition section 540, such as already described, for example, for the picture analysis section 530.

The display control section 580 causes the display included in the output section 270 of the smart phone 200 to display a picture, for example, by using the picture acquired by the picture acquisition section 540. For example, the display control section 580 may cause the display to display a picture acquired in real time by the picture acquisition section 540 as a through picture. Further, the display control section 580 may reproduce, and cause the display to display, a picture temporarily or continuously recorded in the storage section 565 by the recording control section 560. Further, the display control section 580 may cause the display to display various types of analysis results by the analysis section 570.

(3-1. Control of Recording Using Sensor Data)

The recording control section 560 controls recording (continuous recording to the storage section 565) of the picture acquired by the picture acquisition section 540, for example, based on the sensor data acquired by the sensor data acquisition section 550. In the present embodiment, for example, it is possible to specify the instant of an impact between the racket R and the ball, based on the vibration data acquired by the sensor data acquisition section 550. Accordingly, the recording control section 560 may cause recording to stop, for example, at the instant of an impact, or after a prescribed time has elapsed from the instant of an impact.

Further, in the present embodiment, for example, it may also be possible to specify the timing at which a specific play or a preliminary operation of a play has been started, based on motion data (an acceleration, angular velocity, direction or the like) acquired by the sensor data acquisition section 550. Accordingly, the recording control section 560 may cause recording to start, for example, in the case where a player starts a preliminary operation of a specific play. In addition, the start and the end of recording can both be automated, if recording is stopped at the instant of an impact, or after a prescribed time has elapsed from the instant of an impact, such as described above.

Figure 11:
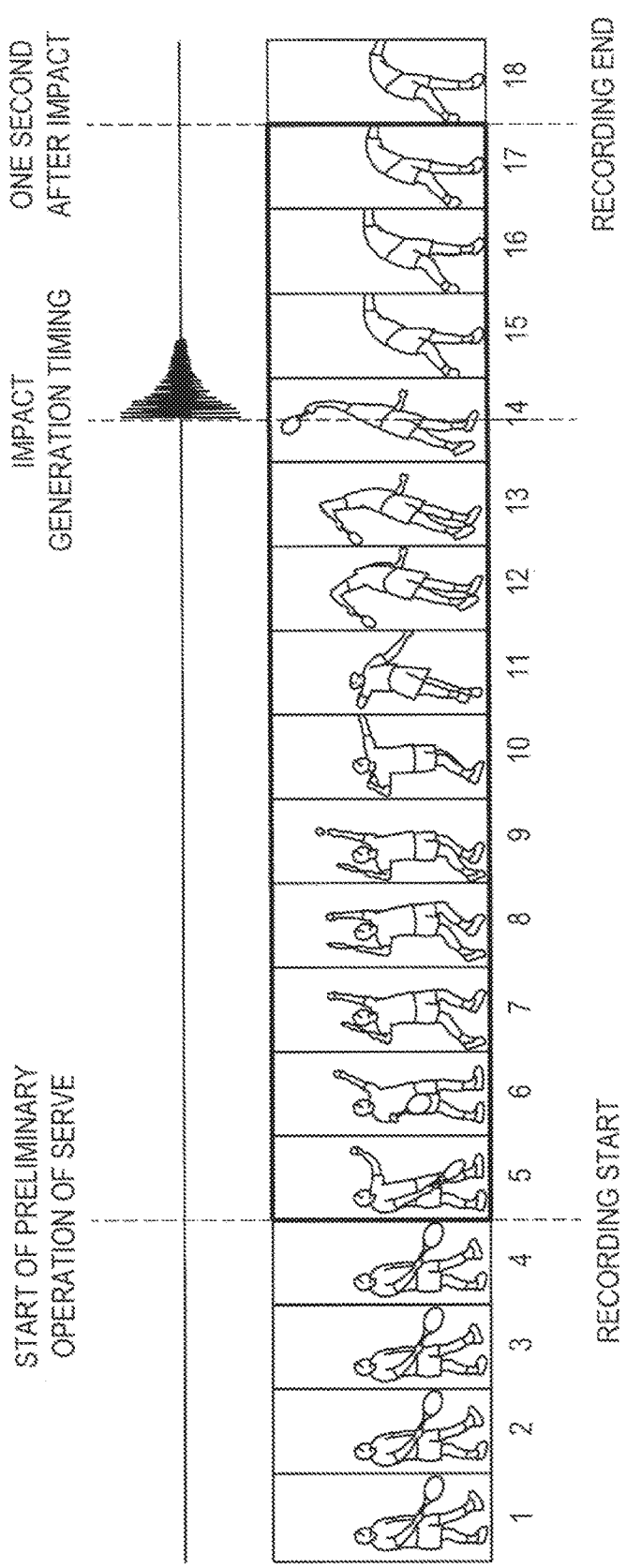
FIG. 11 is a figure for describing an example of a control of recording in an embodiment of the present disclosure.

FIG. 11 is a figure for describing an example of a control of recording in an embodiment of the present disclosure. In the example shown in FIG. 11, it is detected that a preliminary operation of a serve has been started, based on motion data acquired by the sensor data acquisition section 550, at the point in time of the 5th frame of a moving picture (continuously captured). Accordingly, the recording control section 560 starts recording of a picture from here. Note that, while the figure shows the start of the preliminary operation and the recording start at a same timing, as it is a schematic, time is actually necessary for an analysis of motion data and an execution of a recording control, and so recording may be started at a point in time when the above time has elapsed from when motion data showing the start of the preliminary operation is acquired.

Further, in the illustrated example, it is detected that an impact between the racket and the ball is generated, based on the vibration data acquired by the sensor data acquisition section 550, at the point in time of the 14th frame of the moving picture. Accordingly, the recording control section 560 ends recording up until the 17th frame of the moving picture, which corresponds to a point in time one second after an impact. By such a control of recording, for example, a segment of a play to be recorded as a picture can be recorded without excess or deficiency, and the time for editing of the user after-the-fact can be saved. Further, for example, in this way, the range to search for an analysis segment may be reduced, and the processing load may be reduced, if a segment of the specified picture is provided, for example, as an analysis segment to become a target of analysis by the analysis section 570.

(3-2. Picture Reproduction of a Segment Different to an Analysis Segment)

As described above, the recording control section 560 may temporarily record the picture acquired by the picture acquisition section 540 in the storage section 565, and may generate a picture displayed on the display by the display control section 580 from this picture. For example, this picture may be a moving picture from which a segment of a specific play by a user is cut out, described in the above example of a recording control. Here, for example, while the recording control section 560 may provide the same segment as a segment to be reproduced by the display control section 580, in the case where an analysis segment to become a target of analysis by the analysis section 570 is specified from within the picture acquired by the picture acquisition section 540, based on the sensor data acquired by the sensor data acquisition section 550, a segment longer than this segment may be set to a segment to be reproduced by the display control section 580.

Figure 12:
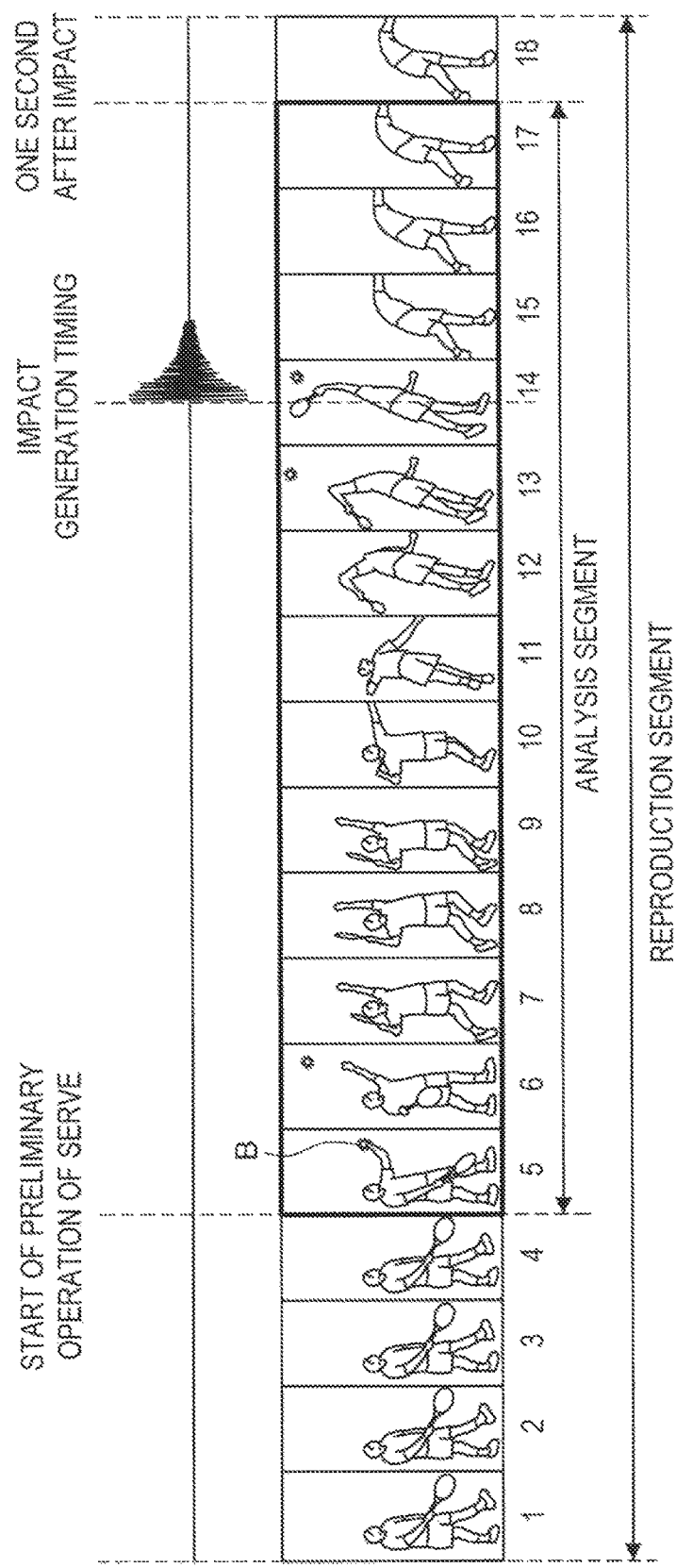
FIG. 12 is a figure for describing an example of picture reproduction of a segment different to an analysis segment in an embodiment of the present disclosure.

FIG. 12 is a figure for describing an example of picture reproduction of a segment different to an analysis segment in an embodiment of the present disclosure. In the example shown in FIG. 12, from the 5th frame up until the 17th frame of a moving picture (continuously captured) is specified by the recording control section 560 as an analysis segment by the analysis section 570. On the other hand, the recording control section 560 specifies from the 1st frame up until the 18th frame of the moving picture, as a segment to be reproduced during analysis by the display control section 580. At this time, in the reproduced picture, a track of the ball B may be displayed, based on a result of analysis by the analysis section 570.

Note that, in the illustrated example, since the moving picture is continuously captured before and after the illustrated range, it does not necessarily mean that the 1st frame and the 18th frame are the first and the final frames of the moving picture. For example, the recording control section 560 may specify a reproduction segment by extending the segment specified as an analysis segment before and after only a prescribed length. The length of extension may be determined, for example, for each of the start point and the end point of an analysis segment, in accordance with a temporal distance from the point in time of an impact generation.

In the case where picture analyzing the moving picture, it is necessary to process a picture of each frame constituting the moving picture, and so there will be a tendency for the processing time to become long. Accordingly, as in the above example, an analysis segment of the moving picture can be set without excess or deficiency based on the sensor data, a segment longer than the analysis segment can be set for a reproduction segment of the moving picture reproduced during an execution of analysis, and the waiting time of a sensory analysis process of a user can be reduced.

(3-3. Picture Display During Analysis)

Figure 13:
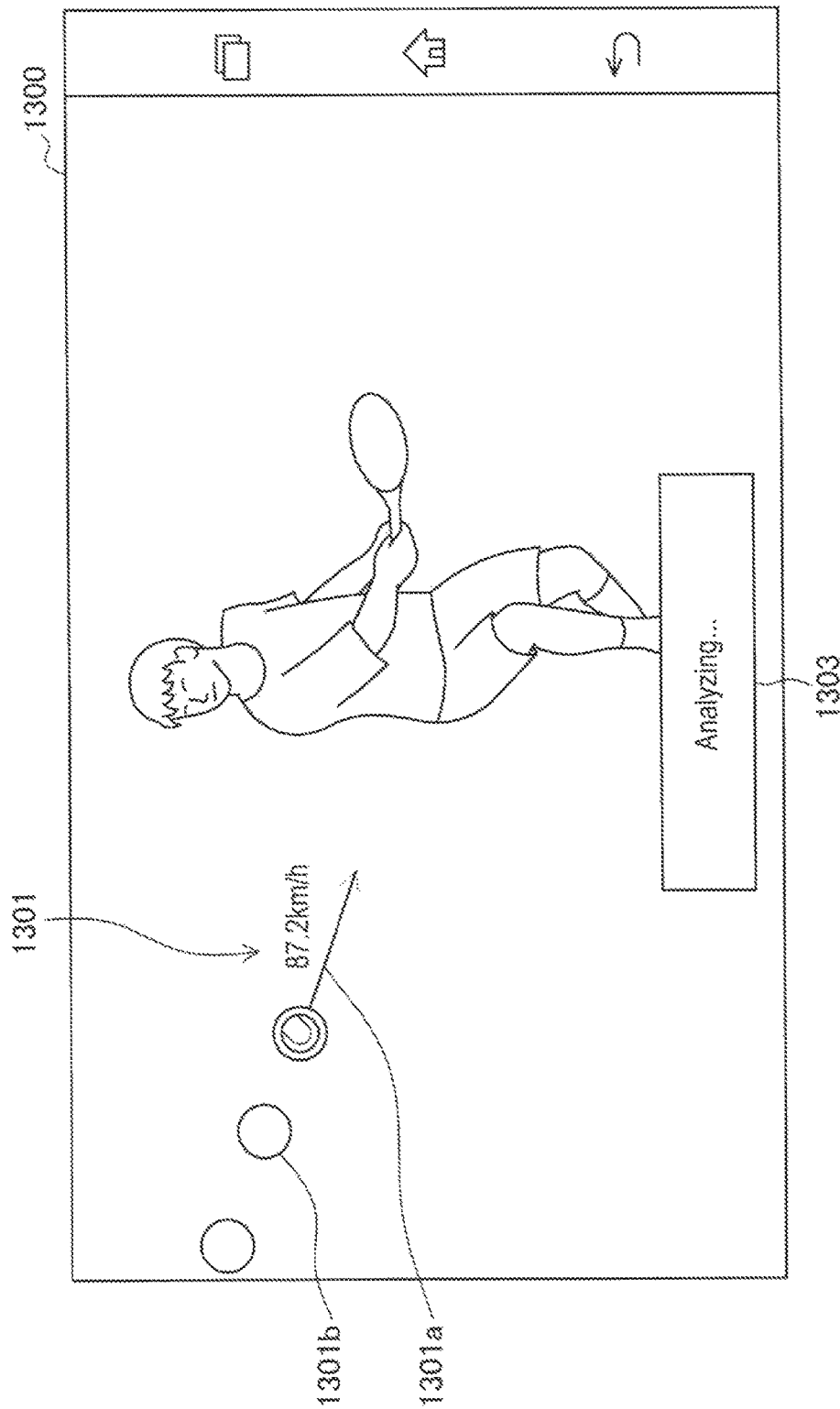
FIG. 13 is a figure that shows a first example of a picture display during analysis in an embodiment of the present disclosure.

FIG. 13 is a figure that shows a first example of a picture display during analysis in an embodiment of the present disclosure. In the example shown in FIG. 13, in a picture 1300 displayed on the display included in the output section 270 of the smart phone 200, for example, ball velocity information 1301, and a display during analysis 1303 are displayed superimposed on a still picture extracted from a picture of a reproduction segment. The ball velocity information 1301 is displayed, for example, by using a result of an analysis process based on the picture or sensor data in the analysis section 570. Further, the ball velocity information 1301 may be displayed along with an arrow 1301*a* showing a progress direction of the ball, and a FIG. 1301*b* showing a track of the ball. The progress direction of the ball, the track of the ball, and the velocity of the ball may be sequentially specified in accordance with the progression of the analysis process. Therefore, the elements constituting the ball velocity information 1301 may be gradually displayed, for example, in the order from being specified in the analysis process.

Figure 14:
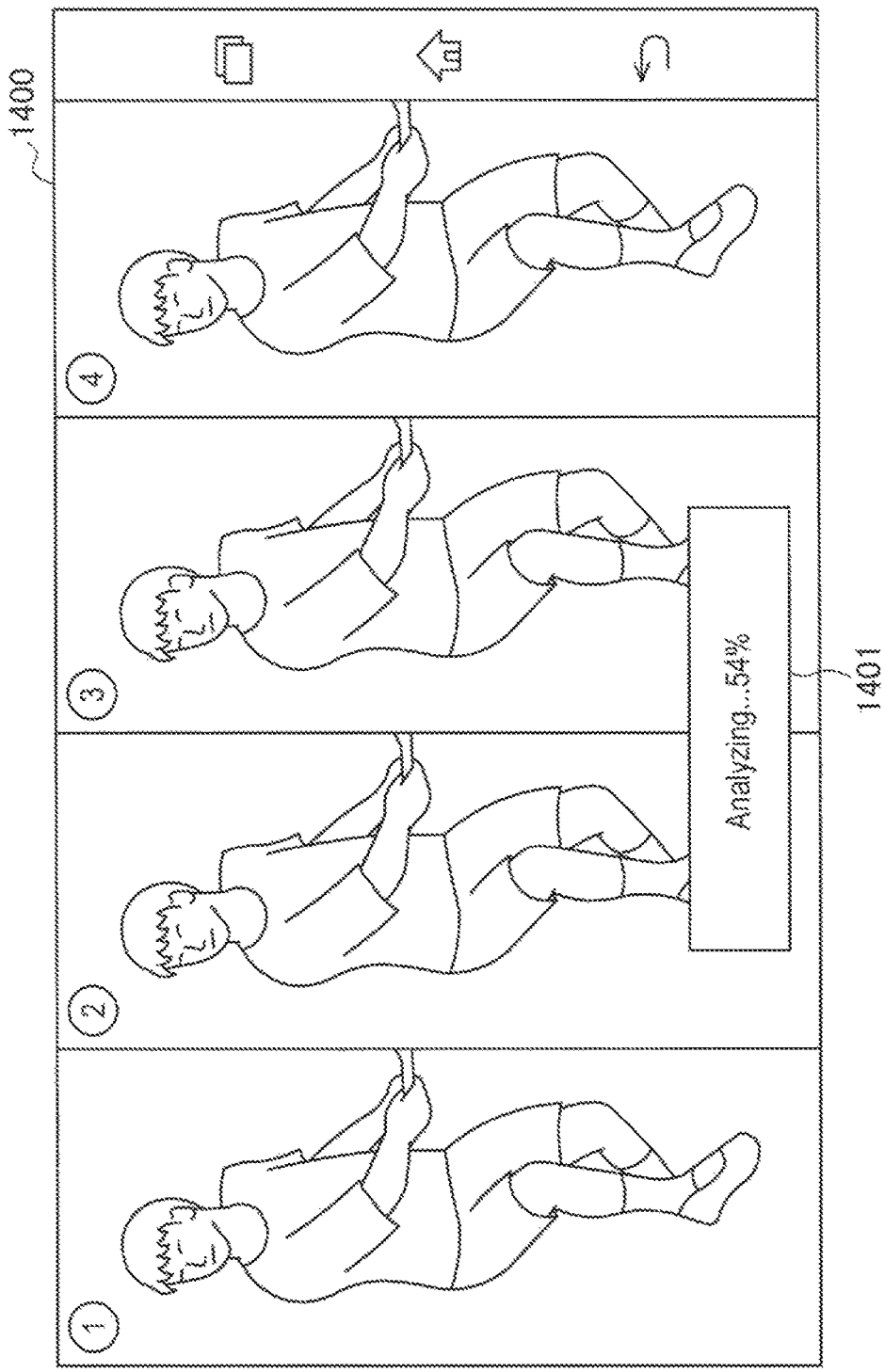
FIG. 14 is a figure that shows a second example of a screen display during analysis in an embodiment of the present disclosure.

FIG. 14 is a figure that shows a second example of a screen display during analysis in an embodiment of the present disclosure. In the example shown in FIG. 14, in a picture 1400 displayed on the display included in the output section 270 of the smart phone 200, for example, a rectangular region that includes a player, cut out from a picture of a reproduction segment, is arranged and displayed, along with a display during analysis 1401. These pictures are extracted from a series of frame pictures, for example, at prescribed time intervals. While four pictures are arranged in the illustrated example, a larger number of pictures may be arranged. Further, for example, multiple cut-out pictures may be displayed by automatic scrolling, or a picture may be displayed by scrolling in accordance with a flick operation or the like executed by a user via a touch panel or the like.

For example, in the case where the composition of the picture acquired by the picture acquisition section 540 is already known, by the above functions of the composition specification information output section 520, a region that includes a prescribed object that is not picture analyzed, for example, a region that includes the player, can be cut out from the picture. Therefore, after the start of an analysis process, the display such as of the picture 1400 shown above in FIG. 14 can be implemented at an earlier stage.

Figure 15:
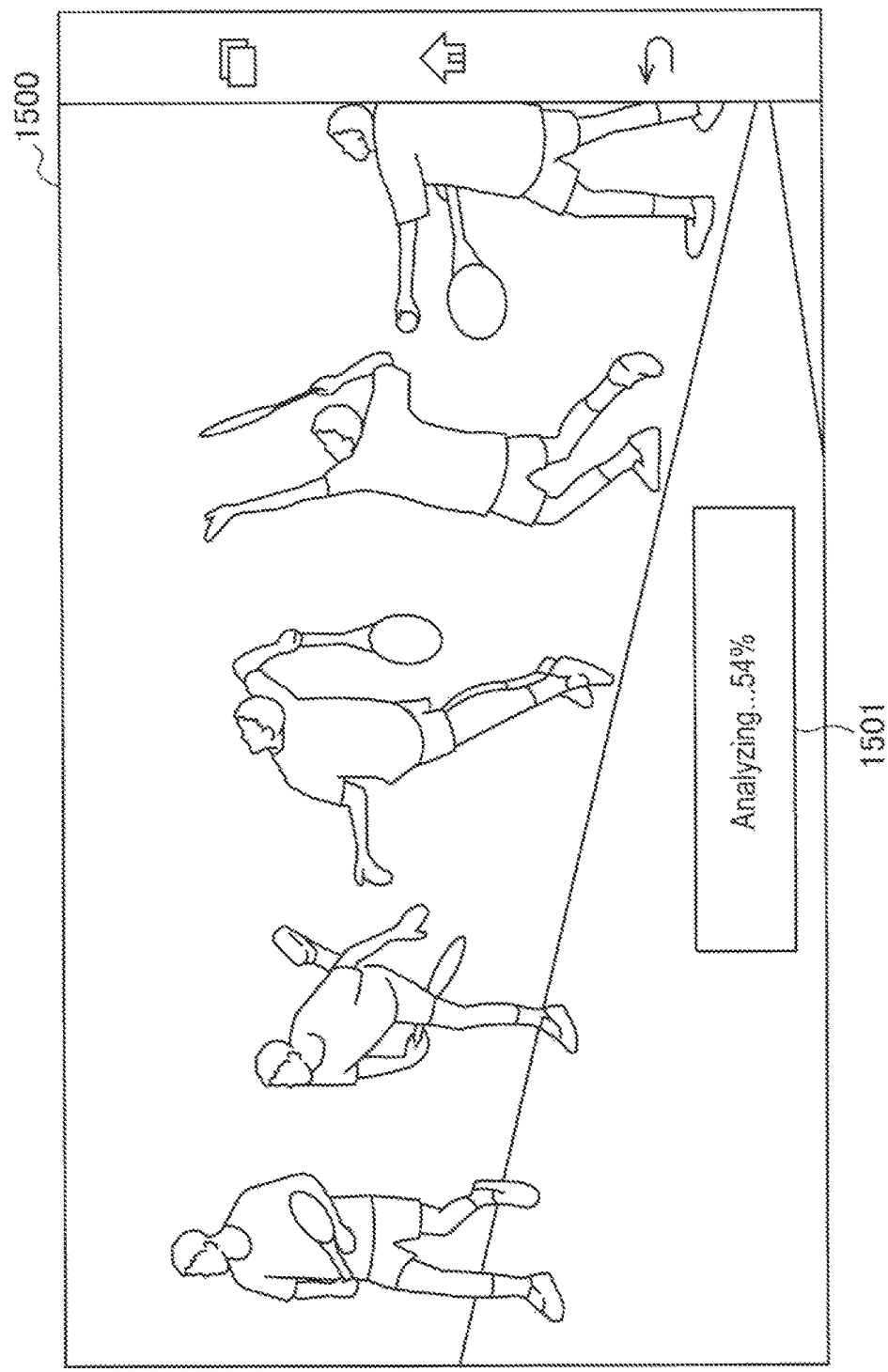
FIG. 15 is a figure that shows a third example of a screen display during analysis in an embodiment of the present disclosure.

FIG. 15 is a figure that shows a third example of a screen display during analysis in an embodiment of the present disclosure. In the example shown in FIG. 15, in a picture 1500 displayed on the display included in the output section 270 of the smart phone 200, for example, a picture of a player, extracted from a picture of a reproduction segment, is displayed overlapping the background, along with a display during analysis 1501. The picture of the player is acquired by cutting out a portion where the player is reflected, from pictures extracted from a series of frame pictures, for example, at prescribed time intervals. While five pictures are overlapping in the illustrated example, a larger number of pictures may be overlapping. Further, the position or velocity of the ball may be additionally displayed superimposed, such as in the example described above with reference to FIG. 13.

In order to implement the display such as of the above picture 1500, a picture analysis is necessary for specifying the region where the player is reflected in each picture.

Therefore, it will take more time for the display of the picture 1500, for example, than for the display of the picture 1400. However, for example, in the case where the composition of the picture acquired by the picture acquisition section 540 is already known, by the above functions of the composition specification information output section 520, the range to search for a picture of the player by a picture analysis will be limited, and so the time taken for the display of the picture 1500 may be shortened.

The above described displays all cause a picture that includes a still picture, for example, to be displayed. Therefore, a user may hardly feel the passage of time, and the waiting time of a sensory analysis process may be shortened, for example, compared to a case such as reproducing a segment of a play by a repeating moving picture.

(3-4. Display of an Analysis Result)

Further, in the present embodiment, by using an analysis result by the analysis section 570, for example, it is possible to express, with more versatility, a series of movements in a play, and a result implemented by this.

For example, in the case where the display control section 580 reproduces a moving picture, in which a series of movements in a play are captured, the reproduction velocity may change in the middle of reproduction, by using the fact that the instant of an impact is specified based on sensor data. For example, the display control section 580 may change the reproduction velocity such as one times the velocity up until one second before an impact, half the velocity from here up until the instant of an impact, one-tenth the velocity from the instant of an impact up until 0.5 seconds afterwards, and one times the velocity from here onwards. In this way, a slow reproduction is automatically executed, for example, in important segments such as before and after an impact.

Further, for example, the display control section 580 may simultaneously output a result of a picture analysis and a result of an analysis of the sensor data. As described above, it is possible for the analysis section 570 to obtain various information related to a play, based on the picture acquired by the picture acquisition section 540 and the sensor data acquired by the sensor data acquisition section 550. Accordingly, for example, in addition to a position or velocity of the ball obtained by a result of a picture analysis, a shot power, a track of the racket, a spin amount of the ball or the like obtained by an analysis of the sensor data may be output by being simultaneously displayed on a display or the like.

Further, for example, the recording control section 560 may generate sequential photographs, in which a series of movements are captured, on the basis of the instant of an impact specified by an analysis of the sensor data. For example, the recording control section 560 may generate sequential photographs, by extracting frames of a moving picture at shorter intervals as it approaches an impact, and at longer intervals as it moves away from an impact.

Further, for example, the display control section 580 may output a statistical indicator extracted from an analysis result by the analysis section 570. For example, the display control section 580 may output a statistical indicator, such as the stability or proficiency of a toss, by displaying on a display or the like, based on an analysis result of a past play of a player.

Further, for example, the display control section 580 may output information comparing an analysis result by the analysis section 570 with another player. For example, the display control section 580 may cause a plurality of pictures, in which a play of a player is captured, to be reproduced in parallel, on the basis of the instant of an impact specified by an analysis of the sensor data. Parallel reproduction of a plurality of pictures may be reproduced, for example, by arranging the pictures up-down or left-right, or may be reproduced by transparently superimposing the pictures. In this way, for example, the difference of a play between a player and another player (for example, a professional) can be expressed that is easier to understand, and it also becomes possible to set advice based on a comparison result.

Further, for example, the display control section 580 may reproduce a picture, in which a series of movements in a play are captured, and may apply an effect by using an analysis result based on the sensor data. More specifically, the display control section 580 may apply respectively different effects before an impact, at the time of an impact, and after an impact, to a picture or a part of a picture (the region of the player or the ball). Further, the display control section 580 may cause the expression of an effect to change in accordance with an analysis result (for example, the velocity of the racket or the ball) based on the sensor data.

(4. Hardware Configurations)

Next, examples of hardware configurations for implementing the sensor apparatus and the analysis apparatus (in the above described examples, the smart phone or the server) according to an embodiment of the present disclosure will be described with reference to FIG. 16 and FIG. 17.

(Sensor Apparatus)

Figure 16:
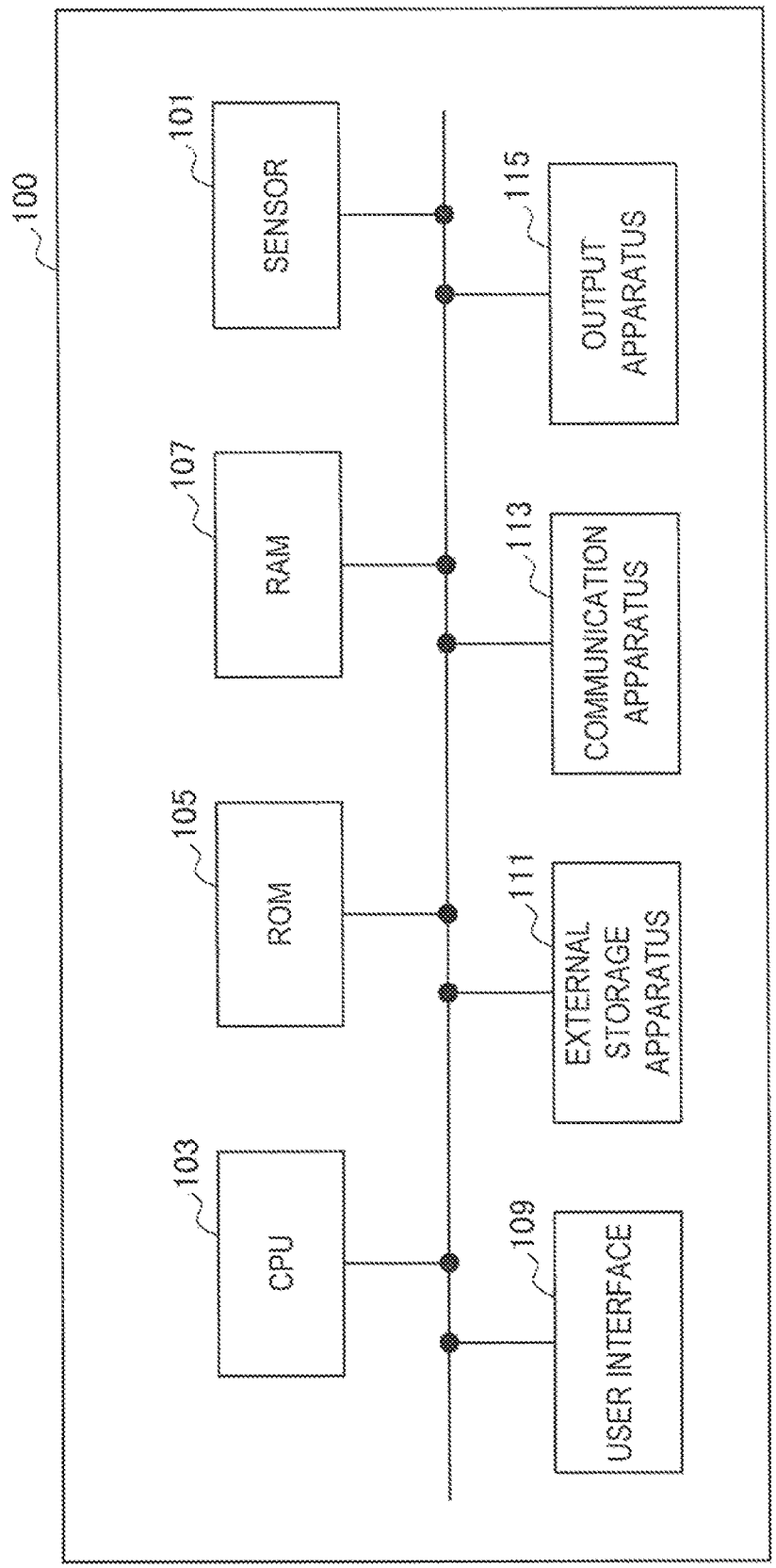
FIG. 16 is a figure that shows an example of a hardware configuration of a sensor apparatus according to an embodiment of the present disclosure.

FIG. 16 is a figure that shows an example of a hardware configuration of the sensor apparatus according to an embodiment of the present disclosure. With reference to FIG. 16, the sensor apparatus 100 may include a sensor 101, a Central Processing Section (CPU) 103, a Read Only Memory (ROM) 105, a Random Access Memory (RAM) 107, a user interface 109, an external storage apparatus 111, a communication apparatus 113, and an output apparatus 115. These elements are mutually connected by a bus, for example.

For example, the sensor 101 includes an acceleration sensor, an angular velocity sensor, a vibration sensor, a magnetic field sensor, a temperature sensor, a pressure sensor (including a press switch), a Global Positioning System (GPS) receiver or the like. The sensor 101 may include a camera (image sensor) or a microphone (audio sensor).

The CPU 103, the ROM 105 and the RAM 107 implement various types of functions with software, by reading and executing program instructions, for example, recorded in the external storage apparatus 111. In the embodiments of the present disclosure, functions such as control of the entire sensor apparatus 100 may be implemented, for example, by the CPU 103, the ROM 105 and the RAM 107.

The user interface 109 is, for example, an input apparatus such as buttons or a touch panel, which receives user operations of the sensor apparatus 100. For example, operations of a user may instruct the start or completion of the transmission of sensor information from the sensor apparatus.

The external storage apparatus 111 stores various types of information related to the sensor apparatus 100. For example, program instructions for causing functions to be implemented by software in the CPU 103, the ROM 105 and RAM 107 may be stored in the external storage apparatus 111, or data acquired by the sensor 101 may be cached temporarily. When considering that the sensor apparatus 100 is mounted in a hitting tool or the like, it is desirable to use a sensor apparatus, for example, with a strong impact such as a semiconductor memory, as the external storage apparatus 111.

The communication apparatus 113 communicates with the analysis apparatus 600, which will be described below, by various types of wired or wireless communication systems. Further, the communication apparatus 113 may directly communicate with the analysis apparatus 600 by inter-device communication, or may communicate with the analysis apparatus 600 via a network such as the internet.

The output apparatus 115 is constituted by an apparatus capable of outputting information as light, audio or pictures. For example, the output apparatus 115 may output information that notifies a detection of a time or play event in the sensor apparatus 100, or may output a visual or aural notification to a user, based on an analysis result received from the analysis apparatus 600 or an analysis result calculated in the sensor apparatus 100. For example, the output apparatus 115 includes, for example, a display such as a lamp of an LED or the like or an LCD, a speaker, a vibrator or the like.

(Analysis Apparatus)

FIG. 17 is a figure that shows an example of a hardware configuration of the analysis apparatus according to an embodiment of the present disclosure. The analysis apparatus 600 may implement, for example, the analysis apparatus according to an embodiment of the present disclosure, or the smart phone 200 or the server 300 described above. Note that, as described above, the analysis apparatus may be implemented by the sensor apparatus 100.

The analysis apparatus 600 may include a CPU 601, a ROM 603, a RAM 605, a user interface 609, an external storage apparatus 611, a communication apparatus 613, and an output apparatus 615. These elements are mutually connected by a bus, for example.

The CPU 601, the ROM 603 and the RAM 605 implement various types of functions with software, by reading and executing program instructions, for example, recorded in the external storage apparatus 611. In the embodiments of the present disclosure, control of the entire analysis apparatus 600, functions of the processing section in the above described functional configuration or the like, may be implemented, for example, by the CPU 601, the ROM 603 and the RAM 605.

The user interface 609 is, for example, an input apparatus such as buttons or a touch panel, which receives user operations of the analysis apparatus 600.

The external storage apparatus 611 stores various types of information related to the analysis apparatus 600. For example, program instructions for causing functions to be implemented by software in the CPU 601, the ROM 603 and RAM 605 may be stored in the external storage apparatus 611, or sensor information received by the communication apparatus 613 may be cached temporarily. Further, a log of analysis results may be accumulated in the external storage apparatus 611.

The output apparatus 615 is constituted by an apparatus capable of visually or aurally notifying information to a user. For example, the output apparatus 615 may be a display device such as a Liquid Crystal Display (LCD), or an audio output device such as a speaker or headphones. The output apparatus 615 outputs a result obtained by the processes of the analysis apparatus 600 as video pictures such as text or pictures, or outputs the results as audio such as voices or sounds.

Heretofore, examples of the hardware configurations of the sensor apparatus 100 and the analysis apparatus 600 have been shown. Each of the above described constituent elements may be constituted by using generic members, or may be constituted by hardware specialized for the functions of each of the constituent elements. Such a configuration may be appropriately changed in accordance with the technology level at the time of implementation.

(5. Supplement)

For example, the embodiments of the present disclosure may include an analysis apparatus such as that described above (an information processing terminal such as a smart phone, a server, or a sensor apparatus), a system, an information processing method executed by the analysis apparatus or the system, a program for causing the analysis apparatus to function, and a non-temporarily tangible medium on which programs are recorded.

The preferred embodiment(s) of the present disclosure has/have been described above with reference to the accompanying drawings, whilst the present disclosure is not limited to the above examples. A person skilled in the art in the technical field of the present disclosure may find various alterations and modifications within the scope of the appended claims, and it should be understood that they will naturally come under the technical scope of the present disclosure.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1) An information processing apparatus, including:

an angular field estimation section configured to estimate an angular field of a picture acquired by an imaging apparatus, based on positions of at least two points whose position relationship in a real space is already known in the picture; and a composition specification information output section configured to output information specifying a composition of the picture, in a manner that a position relationship between a photographic subject and the imaging apparatus, prescribed in accordance with the angular field, is satisfied.

(2) The information processing apparatus according to (1), wherein the angular field estimation section estimates an angular field of the picture based on a position of an image of a first flat or three-dimensional object including the at least two points in the picture.

(3) The information processing apparatus according to (2), wherein the first flat or three-dimensional object includes a line prescribing a court, a field, or a course.

(4) The information processing apparatus according to any one of (1) to (3), wherein the composition specification information output section outputs information for displaying a guide where the specified composition is implemented by overlapping on a second flat or three-dimensional object visually recognized in a through picture acquired by the imaging apparatus.

(5) The information processing apparatus according to (4), wherein the second flat or three-dimensional object includes a line prescribing a court, a field, or a course, and the photographic subject arranged at a prescribed position on the court, the field, or the course.

(6) The information processing apparatus according to any one of (1) to (5), wherein the composition specification information output section outputs information specifying the composition of the picture, in a manner that at least three points in a vicinity of the photographic subject are arranged at prescribed positions in the picture.

(7) The information processing apparatus according to any one of (1) to (6),
wherein the photographic subject includes a player arranged on a court or a field, and a ball thrown by a play of the player.

(8) The information processing apparatus according to (7),
wherein the composition specification information output section outputs information specifying the composition of the picture, in a manner that the ball is positioned within the angular field of the picture, at a prescribed time after the play.

(9) The information processing apparatus according to (1) or (2),
wherein the angular field estimation section estimates the angular field of the picture based on a position change of an object falling through a track including the at least two points in the picture.

(10) The information processing apparatus according to any one of (1) to (9),
wherein the photographic subject includes a flying object, and
wherein the information processing apparatus further includes a picture analysis section configured to estimate a velocity of the flying object based on a picture acquired in accordance with the composition.

(11) The information processing apparatus according to any one of (1) to (10),
wherein the photographic subject includes a rotating object, and
wherein the information processing apparatus further includes a picture analysis section configured to estimate a rotation velocity of the object based on a picture acquired in accordance with the composition.

(12) The information processing apparatus according to any one of (1) to (11),
wherein the photographic subject includes a parabolic-moving object, and
wherein the information processing apparatus further includes a picture processing section configured to estimate a position change amount of the parabolic-moving object based on a picture acquired in accordance with the composition.

(13) A recording medium having a program stored therein, the program causing a computer to implement:
a function of estimating an angular field of a picture acquired by an imaging apparatus, based on positions of at least two points whose position relationship in a real space is already known in the picture; and
a function of outputting information specifying a composition of the picture, in a manner that a position relationship between a photographic subject and the imaging apparatus, prescribed in accordance with the angular field, is satisfied.

(14) An information processing method, including:
estimating, by a processor, an angular field of a picture acquired by an imaging apparatus, based on positions of at least two points whose position relationship in a real space is already known in the picture; and
outputting information specifying a composition of the picture, in a manner that a position relationship between a photographic subject and the imaging apparatus, prescribed in accordance with the angular field, is satisfied.

REFERENCE SIGNS LIST 10 system
100 sensor apparatus
200 smart phone
300 server
310 reception section
510 angular field estimation section
520 composition specification information output section
530 picture analysis section
540 picture acquisition section
550 sensor data acquisition section
560 recording control section
565 storage section
570 analysis section
580 display control section

The invention claimed is:

1. An information processing apparatus, comprising:
circuitry configured to:
control an imaging apparatus to acquire a first picture;
display marks at a first plurality of positions of at least two points in the first picture, wherein the at least two points have a first position relationship in a real space;
estimate an angular field of the first picture, wherein the angular field of the first picture is estimated based on the displayed marks at the first plurality of positions of the at least two points in the first picture; and
output first information specifying a composition of the first picture based on a second position relationship between a photographic subject of the first picture and the imaging apparatus,
wherein the second position relationship is based on the angular field.

2. The information processing apparatus according to claim 1,
wherein the circuitry is further configured to estimate the angular field of the first picture based on a position of an image of at least one of a first flat object or a first three-dimensional object, and wherein the image includes the at least two points in the first picture.

3. The information processing apparatus according to claim 2,
wherein the at least one of the first flat object or the first three-dimensional object includes a line that indicates at least one of a court, a field, or a course.

4. The information processing apparatus according to claim 1,
wherein the circuitry is further configured to output second information to display a guide where the composition is implemented, wherein the composition is implemented based on an overlap of the guide on at least one of a second flat object or a second three-dimensional object visually recognized in a through picture acquired by the imaging apparatus.

5. The information processing apparatus according to claim 4,
wherein the at least one of the second flat object or the second three-dimensional object includes a line that indicates at least one of a court, a field, or a course, and wherein the photographic subject is on at least one of the court, the field, or the course.

6. The information processing apparatus according to claim 1,
wherein the circuitry is further configured to output second information specifying the composition of the first picture, wherein the second information is based on at least three points that are at three positions in the first picture, and
wherein the at least three points are at a specific distance from the photographic subject.

7. The information processing apparatus according to claim 1, wherein the photographic subject includes:
a player on one of a court or a field, and
a ball thrown by the player.

8. The information processing apparatus according to claim 7,
wherein the circuitry is further configured to output second information specifying the composition of the first picture, wherein the second information is based on the ball within the angular field of the first picture, at a time after the ball is thrown.

9. The information processing apparatus according to claim 1,
wherein the circuitry is further configured to estimate the angular field of the first picture based on a position change of an object that falls on a surface of a track, and
wherein the track includes the at least two points in the first picture.

10. The information processing apparatus according to claim 1,
wherein the photographic subject includes a flying object, and
wherein the circuitry is further configured to estimate a velocity of the flying object based on a second picture acquired based on the composition.

11. The information processing apparatus according to claim 1,
wherein the photographic subject includes a rotating object, and
wherein the circuitry is further configured to estimate a rotation velocity of the rotating object based on a second picture acquired based on the composition.

12. The information processing apparatus according to claim 1,
wherein the photographic subject includes a parabolic-moving object, and
wherein the circuitry is further configured to estimate a position change amount of the parabolic-moving object based on a second picture acquired based on the composition.

13. A non-transitory computer-readable medium having stored thereon, computer-executable instructions, which when executed by an information processing apparatus, cause the information processing apparatus to execute operations, the operations comprising:
controlling an imaging apparatus to acquire a picture;
displaying marks at a plurality of positions of at least two points in the picture, wherein the at least two points have a first position relationship in a real space;
estimating an angular field of the picture, wherein the angular field of the picture is estimated based on the plurality of positions of the at least two points in the picture; and
outputting information specifying a composition of the picture based on a second position relationship between a photographic subject of the picture and the imaging apparatus, wherein the second position relationship is based on the angular field.

14. An information processing method, comprising:
controlling, by a processor, an imaging apparatus to acquire a picture;
displaying, by the processor, marks at a plurality of positions of at least two points in the picture, wherein the at least two points have a first position relationship in a real space;
estimating, by the processor, an angular field of the picture, wherein the angular field of the picture is estimated based on the plurality of positions of the at least two points in the picture; and
outputting information specifying a composition of the picture based on a second position relationship between a photographic subject of the picture and the imaging apparatus, wherein the second position relationship is based on the angular field.

* * * * *